(12) United States Patent
Ishii et al.

(10) Patent No.: US 8,310,948 B2
(45) Date of Patent: Nov. 13, 2012

(54) BASE STATION APPARATUS AND COMMUNICATIONS CONTROL METHOD

(75) Inventors: Hiroyuki Ishii, Yokosuka (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 316 days.

(21) Appl. No.: 12/523,480

(22) PCT Filed: Dec. 27, 2007

(86) PCT No.: PCT/JP2007/075168
§ 371 (c)(1),
(2), (4) Date: Sep. 3, 2009

(87) PCT Pub. No.: WO2008/087846
PCT Pub. Date: Jul. 24, 2008

(65) Prior Publication Data
US 2010/0087200 A1    Apr. 8, 2010

(30) Foreign Application Priority Data

Jan. 19, 2007 (JP) ................................. 2007-010858
Jun. 6, 2007 (JP) ................................. 2007-150934
Dec. 4, 2007 (JP) ................................. 2007-313963
Dec. 20, 2007 (JP) ................................. 2007-329026

(51) Int. Cl.
*H04W 72/00* (2009.01)
(52) U.S. Cl. ......... 370/252; 370/329; 370/341; 455/509
(58) Field of Classification Search ........................ None
See application file for complete search history.

(56) References Cited

U.S. PATENT DOCUMENTS

| | | | | |
|---|---|---|---|---|
| 2003/0210660 A1* | 11/2003 | Wiberg et al. | ................ | 370/320 |
| 2003/0214966 A1* | 11/2003 | Taylor | ............................ | 370/432 |
| 2005/0063341 A1* | 3/2005 | Ishii et al. | ..................... | 370/332 |
| 2007/0014274 A1* | 1/2007 | Choi | ............................. | 370/349 |
| 2007/0232265 A1* | 10/2007 | Park et al. | ..................... | 455/410 |
| 2007/0274343 A1* | 11/2007 | Nishio | ........................... | 370/479 |
| 2010/0279634 A1* | 11/2010 | Sagfors et al. | ............. | 455/127.1 |
| 2010/0322156 A1* | 12/2010 | Wu | ................................ | 370/329 |

FOREIGN PATENT DOCUMENTS

| | | |
|---|---|---|
| JP | 08154097 A | 6/1996 |
| JP | 2002-112321 | 4/2002 |
| JP | 2003-199144 A | 7/2003 |
| JP | 2004-072157 A | 3/2004 |
| WO | 2006/037492 A1 | 4/2006 |

OTHER PUBLICATIONS

Patent Abstracts of Japan, Publication No. 2004-072157, dated Mar. 4, 2004, 1 page.

(Continued)

*Primary Examiner* — Chi H. Pham
*Assistant Examiner* — Shick Hom
(74) *Attorney, Agent, or Firm* — Osha Liang LLP

(57) ABSTRACT

The base station apparatus calculates the number of the mobile stations associated with a consumption amount of radio resources, and carries out call admission control in accordance with the number of the mobile station. The base station apparatus includes a calculation section that calculates the number of the mobile stations having data to be transmitted in a transmission buffer, and a call admission section that carries out new call admission in accordance with the number of the mobile stations.

54 Claims, 11 Drawing Sheets

OTHER PUBLICATIONS

Patent Abstracts of Japan, Publication No. 2003-199144, dated Jul. 11, 2003, 1 page.

3GPP TR 25.814 V7.0.0, Jun. 2006, "Physical layer aspects for evolved Universal Terrestrial Radio Access (UTRA)," 126 pages.

3GPP TS 36.300 V0.3.1, Nov. 2006, Evolved Universal Terrestrial Radio Access (E-UTRA) and Evolved Universal Terrestrial Radio Access Network (E-UTRAN), 64 pages.

International Search Report issued in PCT/JP2007/075168, mailed on Apr. 15, 2008, with translation, 3 pages.

Written Opinion issued in PCT/JP2007/075168, mailed on Apr. 15, 2008, 4 pages.

Japanese Office Action for Japanese Application No. 2008-553997, mailed on Jun. 8, 2010 (5 pages).

Patent Abstracts of Japan for Japanese Publication No. 2002-112321, Publication date Apr. 12, 2002 (1 page).

Japanese Office Action for Application No. 2008-553997, mailed on Sep. 7, 2010 (4 pages).

Patent Abstracts of Japan for Japanese Publication No. 08-154097, publication date Jun. 11, 1996 (1 page).

* cited by examiner

FIG.3A

| |
|---|
| (FIRST MOBILE STATION NUMBER) > TH1 |
| (SECOND MOBILE STATION NUMBER) > TH2 |
| (THIRD MOBILE STATION NUMBER) > TH3 |
| (FOURTH MOBILE STATION NUMBER) > TH4 |
| (FIFTH MOBILE STATION NUMBER) > TH5 |
| (SIXTH MOBILE STATION NUMBER) > TH6 |
| (PROCESSING LOAD OF OWN BASE STATION APPARATUS) > TH7 |
| (PROCESSING LOAD OF ANOTHER NODE) > TH8 |

FIG.3B

| |
|---|
| (FIRST MOBILE STATION NUMBER) > TH1 |
| (SECOND MOBILE STATION NUMBER) > TH2 |
| (THIRD MOBILE STATION NUMBER) > TH3 |
| (FOURTH MOBILE STATION NUMBER) > TH4 |
| (FIFTH MOBILE STATION NUMBER) > TH5 |
| (SIXTH MOBILE STATION NUMBER) > TH6 |
| (PROCESSING LOAD OF OWN BASE STATION APPARATUS) > TH7 |
| (PROCESSING LOAD OF ANOTHER NODE) > TH8 |
| (SEVENTH MOBILE STATION NUMBER) > TH9 |
| (EIGHTH MOBILE STATION NUMBER) > TH10 |

BASE STATION APPARATUS AND COMMUNICATIONS CONTROL METHOD

TECHNICAL FIELD

The present invention relates to a Long Term Evolution (LTE) system, and specifically to a base station apparatus and a communications control method.

BACKGROUND ART

A communications method as a successor of W-CDMA and HSDPA, namely, Long Term Evolution (LTE) has been considered by a W-CDMA standardization organization 3GPP. As a radio access method, Orthogonal Frequency Division Multiplexing (OFDM) is under consideration for downlink, and Single-Carrier Frequency Division Multiple Access (SC-FDMA) is under consideration for uplink (see Non-patent Publication 1, for example).

In OFDM, a frequency band is divided into plural narrow frequency bands (sub-carriers), and data are placed on the respective divided frequency bands to carry out transmission. The sub-carriers are densely arranged in a frequency direction, allowing the sub-carriers to be partly overlapped without causing interference, thereby realizing high speed transmission and improving frequency usage efficiency.

In SC-FDMA, a frequency band is divided into plural narrow bands, and different narrow bands are used by different terminal devices, so that interference between the user terminals can be reduced. According to SC-FDMA, which is characterized in that variations in the transmission electric power are reduced, a large coverage area and low energy consumption can be realized.

A mobile communications system utilizes indefinite radio resources (frequency, power) to carry out communications, and there is an upper limit of communications capacity. Therefore, the number of mobile stations in a cell has to be limited depending on the communications capacity. For example, when a mobile station tries to start communications anew in the cell, if a large number of mobile stations are carrying out communications in the cell and the communications capacity reaches near the upper limit, the new mobile station has to be controlled so that the new communications are not allowed. More specifically, call admission control can be thought that does not allow the new mobile station to start communications anew when the number of the mobile stations carrying out communications in the cell is counted and the number exceeds a predetermined threshold value, and allows the new mobile station to start communications anew when the number is less than or equal to the predetermined threshold value. From a viewpoint of such call admission control, the number of the mobile stations carrying out communications has to be the number of the mobile stations that are consuming the radio resources.

In addition, there are generally plural carriers in a communications system. For example, when one communications system has a frequency bandwidth of 20 MHz and provides a communication service using W-CDMA in the 20 MHz frequency bandwidth, there exist four W-CDMA carriers because a frequency bandwidth of one carrier in W-CDMA is 5 MHz. In this case, it is preferable from a viewpoint of efficient usage of the frequency resources that the number of mobile stations be equal in each of the four W-CDMA carriers.

Further explanation is made about the number of the mobile stations.

For example, W-CDMA utilizes a dedicated channel individually established between the mobile station and the base station apparatus, and a power resource and a code resource, which are consumed radio resources, are proportional to the number of the dedicated channels. Therefore, the number of the mobile stations carrying out communications in the cell is thought to be the same as the number of mobile stations for which the dedicated channel is established. In addition, the number of mobile stations for which a connection between the mobile station and the base station apparatus is established and the number of mobile stations to which a dedicated channel is established are generally the same.

On the other hand, LTE utilizes shared channels in uplink and in downlink, and the power resource and the code resource, which are consumed radio resources, are shared by plural mobile stations. This means that no radio resources are ensured for the individual mobile station. As a result, it becomes difficult that the number of the mobile stations having connection established with the base station apparatus corresponds one-to-one with the radio resources to be consumed. In addition, because LTE mainly intends packet data transmission, there may be a mobile station that does not consume any radio resources even when the connection is established between the base station apparatus and the mobile station, depending on an occurrence pattern of the packet data. For example, it can be imagined that a mobile station may download web contents in an LTE system only for three minutes out of 20 minutes during which the connection between the mobile station and the base station apparatus is established. Even in this case, it becomes difficult that the mobile stations having connection established with the base station apparatus correspond one-to-one with the radio resources to be consumed. In LTE, a state where the connection between the mobile station and the base station apparatus is established is called an LTE active state or an RRC connected state.

Moreover, it is under consideration that the LTE active state be divided into a state where downlink data are continuously received and a state where downlink data are discontinuously received (see Non-patent Document 2, for example). A state that satisfies the LTE active state and in which downlink data are discontinuously received is called a Discontinuous Reception (DRX) state. Because a mobile station in the DRX state consumes fewer radio resources, it becomes difficult for the mobile stations having connections established with the base station apparatus correspond one-to-one with the radio resources to be consumed.

Non-patent Document 1: 3GPP TR 25.814 (V7.0.0), "Physical Layer Aspects for Evolved UTRA", June 2006.

Non-patent Document 2: 3GPP TR 36.300 (V0.3.1), "Evolved Universal Terrestrial Radio Access (E-UTRA) and Evolved Universal Terrestrial Radio Access Network (E-UTRAN); Overall description; Stage 2", September 2006.

SUMMARY OF INVENTION

Problems to be Solved by the Invention

However, the above background art has the following problems.

As described above, it is difficult in the LTE system for the number of the mobile stations having connection established with the base station apparatus to correspond one-to-one with the resources to be consumed. Namely, the number of the mobile stations having connection established with the base station apparatus does not always agree with the number of mobile stations actually carrying out communications using the radio resource. As a result, a problem is raised in that the above call admission control using the number of the mobile stations having connection established with the base station apparatus cannot be carried out.

An objective of the present invention is to provide a base station apparatus and a communications control method that are capable of calculating the number of mobile stations that actually consume a radio resource among mobile stations having connection established with the base station apparatus.

Another objective of the present invention is to provide a base station apparatus and a communications control method that are capable of carrying out call admission control and selection of frequency bands for carrying out communications, in accordance with the number of the mobile stations that actually consume a radio resource among mobile stations having connection established with the base station apparatus.

Means for Solving the Problem

In order to solve the above problem, a base station apparatus according to an embodiment of the present invention carries out communications with plural mobile stations using a shared channel and includes as one of the characteristics a calculation section that calculates the number of the mobile stations having data to be transmitted through the shared channel in a downlink transmission buffer among the plural mobile stations or the number of the logical channels of said mobile stations among the logical channels of the mobile stations.

By configuring in such a manner, the number of the mobile stations that actually consume a radio resource in downlink can be calculated.

Another base station apparatus according to an embodiment of the present invention carries out communications with plural mobile stations using a shared channel, and includes as one of characteristics a calculation section that calculates at least one of the number of the mobile stations having data to be transmitted through the shared channel in an uplink transmission buffer among the plural mobile stations and or the number of the logical channels of said mobile stations among the logical channels of the mobile stations.

By configuring in such a manner, the number of the mobile stations that actually consume a radio resource in uplink can be calculated.

Another base station apparatus according to an embodiment of the present invention carries out communications with plural mobile stations using a shared channel, and includes as one of characteristics a calculation section that calculates at least one of the number of the mobile stations that highly frequently carries out communications through the shared channel and the number of the mobile stations that less frequently carries out communications through the shared channel.

By configuring in such a manner, the number of the mobile stations that actually consume a radio resource can be calculated.

Another base station apparatus according to an embodiment of the present invention carries out communications with plural mobile stations using a shared channel, and includes as one of characteristics a calculation section that calculates at least one of the number of mobile stations having a transmission rate less than a predetermined threshold value among the plural mobile stations and the number of logical channels of said mobile stations among the logical channels of the plural mobile stations.

By configuring in such a manner, the number of the mobile stations that actually consume a radio resource can be calculated.

Another base station apparatus according to an embodiment of the present invention carries out communications with plural mobile stations using a shared channel, and includes as one of characteristics a first calculation section that calculates at least one of the number of the mobile stations having data to be transmitted through the shared channel in a downlink transmission buffer among the plural mobile stations and the number of the logical channels of said mobile stations among the logical channels of the mobile stations (referred to as the number of first mobile stations, hereinafter);

a second calculation section that calculates at least one of the number of the mobile stations having data to be transmitted through the shared channel in an uplink transmission buffer among the plural mobile stations and the number of the logical channels of said logical channels among the logical channels of the mobile stations (referred to as the number of second mobile stations, hereinafter);

a third calculation section that calculates the number of mobile stations that highly frequently carry out communications through the shared channel (referred to as the number of third mobile stations, hereinafter);

a fourth calculation section that calculates the number of mobile stations that less frequently carry out communications through the shared channel (referred to as the number of fourth mobile stations, hereinafter);

a fifth calculation section that calculates the number of the plural mobile stations (referred to as the number of fifth mobile stations, hereinafter);

a sixth calculation section that calculates at least one of the number of the mobile stations having a transmission rate less than a predetermined threshold value among the plural mobile stations and the number of the logical channels of said mobile stations among the logical channels of the mobile stations (referred to as the number of sixth mobile stations, hereinafter);

a seventh calculation section that calculates at least one of the number of the mobile stations having a data buffered time longer than a predetermined threshold value and the number of the logical channels of said mobile stations among the logical channels of the mobile stations (referred to as the number of seventh mobile stations, hereinafter);

an eighth calculation section that calculates at least one of the number of the mobile stations having data discarded due to delay and the number of the logical channels of said mobile stations among the number of the logical channels of the mobile stations (referred to as the number of eighth mobile stations, hereinafter); and a call admission control section that controls admission of a new communication from the mobile stations in accordance with at least one of the number of the first mobile stations, the number of the second mobile stations, the number of the third mobile stations, the number of the fifth mobile stations, the number of the sixth mobile stations, the number of the seventh mobile stations, and the number of the eighth mobile stations.

By configuring in such a manner, admission control of a newly generated call can be controlled in accordance with the number of the mobile stations that actually consume a radio resource.

Another base station apparatus according to an embodiment of the present invention carries out communications with plural mobile stations using a shared channel, and includes as one of characteristics a first calculation section that calculates at least one of the number of the mobile stations having data to be transmitted through the shared channel in a downlink transmission buffer among the plural mobile stations and the number of the logical channels of said mobile stations among the logical channels of the mobile stations (referred to as the number of first mobile stations, hereinafter);

a second calculation section that calculates at least one of the number of the mobile stations having data to be transmitted through the shared channel in an uplink transmission buffer among the plural mobile stations and the number of the logical channels of said logical channels among the logical channels of the mobile stations (referred to as the number of second mobile stations, hereinafter);

a third calculation section that calculates the number of mobile stations that highly frequently carry out communications through the shared channel (referred to as the number of third mobile stations, hereinafter);

a fourth calculation section that calculates the number of mobile stations that less frequently carry out communications through the shared channel (referred to as the number of fourth mobile stations, hereinafter);

a fifth calculation section that calculates the number of the plural mobile stations (referred to as the number of fifth mobile stations, hereinafter);

a sixth calculation section that calculates at least one of the number of the mobile stations having a transmission rate less than a predetermined threshold value among the plural mobile stations and the number of the logical channels of said mobile stations among the logical channels of the mobile stations (referred to as the number of sixth mobile stations, hereinafter);

a seventh calculation section that calculates at least one of the number of the mobile stations having a data buffered time longer than a predetermined threshold value and the number of the logical channels of said mobile stations among the logical channels of the mobile stations among the number of the logical channels of the mobile stations (referred to as the number of seventh mobile stations, hereinafter);

an eighth calculation section that calculates one of the number of the mobile stations having data discarded due to delay and the number of the logical channels of said mobile stations among the number of the logical channels of the mobile stations (referred to as the number of eighth mobile stations, hereinafter); and a frequency selection section that selects a frequency band with which a mobile station carries out communications anew in accordance with at least one of the number of the first mobile stations, the number of the second mobile stations, the number of the third mobile stations, the number of the fifth mobile stations, the number of the sixth mobile stations, the number of the seventh mobile stations, and the number of the eighth mobile stations, and the processing load with respect to each frequency band.

By configuring in such a manner, a frequency band that a mobile station uses to carryout communications anew can be selected in accordance with the number of the mobile stations that actually consume a radio resource.

Another base station apparatus according to an embodiment of the present invention carries out communications with plural mobile stations using a shared channel, and includes as one of characteristics a first calculation section that calculates at least one of the number of the mobile stations having data to be transmitted through the shared channel in a downlink transmission buffer among the plural mobile stations and the number of the logical channels of said mobile stations among the logical channels of the mobile stations (referred to as the number of first mobile stations, hereinafter);

a second calculation section that calculates at least one of the number of the mobile stations having data to be transmitted through the shared channel in an uplink transmission buffer among the plural mobile stations and the number of the logical channels of said logical channels among the logical channels of the mobile stations (referred to as the number of second mobile stations, hereinafter);

a third calculation section that calculates the number of mobile stations that highly frequently carry out communications through the shared channel (referred to as the number of third mobile stations, hereinafter);

a fourth calculation section that calculates the number of mobile stations that less frequently carry out communications through the shared channel (referred to as the number of fourth mobile stations, hereinafter);

a fifth calculation section that calculates the number of the plural mobile stations (referred to as the number of fifth mobile stations, hereinafter);

a sixth calculation section that calculates at least one of the number of the mobile stations having a transmission rate less than a predetermined threshold value among the plural mobile stations and the number of the logical channels of said mobile stations among the logical channels of the mobile stations (referred to as the number of sixth mobile stations, hereinafter);

a seventh calculation section that calculates at least one of the number of the mobile stations having a data buffered time longer than a predetermined threshold value and the number of the logical channels of said mobile stations among the logical channels of the mobile stations among the number of the logical channels of the mobile stations (referred to as the number of seventh mobile stations, hereinafter);

an eighth calculation section that calculates one of the number of the mobile stations having data discarded due to delay and the number of the logical channels of said mobile stations among the number of the logical channels of the mobile stations (referred to as the number of eighth mobile stations, hereinafter);

a processing load measurement section that measures a processing load with respect to each frequency band; and a frequency selection section that selects a frequency band that a mobile station remains in an area of after completion of communications in accordance with at least one of the number of the first mobile stations, the number of the second mobile stations, the number of the third mobile stations, the number of the fifth mobile stations, the number of the sixth mobile stations, the number of the seventh mobile stations, the number of the eighth mobile stations, and the processing load with respect to each frequency band.

A communications control method, according to an embodiment of the present invention, in a base station apparatus carries out communications with plural mobile stations using a shared channel, and includes as one of the characteristics a first step, in which at least one of the number of the mobile stations having data to be transmitted through the shared channel in a downlink transmission buffer among the plural mobile stations and the number of the logical channels of said mobile stations among the logical channels of the mobile stations (referred to as the number of the first mobile stations, hereinafter) is calculated;

a second step, in which at least one of the number of the mobile stations having data to be transmitted through the shared channel in an uplink transmission buffer among the plural mobile stations and the number of the logical channels of said logical channels among the logical channels of the mobile stations (referred to as the number of the second mobile stations, hereinafter) is calculated;

a third step, in which the number of mobile stations that highly frequently carry out communications through the shared channel (referred to as the number of the third mobile stations, hereinafter) is calculated;

a fourth step, in which the number of mobile stations that less frequently carry out communications through the shared channel (referred to as the number of the fourth mobile stations, hereinafter) is calculated;

a fifth step, in which the number of the plural mobile stations (referred to as the number of the fifth mobile stations, hereinafter) is calculated;

a sixth step, in which at least one of the number of the mobile stations having a transmission rate less than a predetermined threshold value among the plural mobile stations and the number of the logical channels of said mobile stations among the logical channels of the mobile stations (referred to as the number of the sixth mobile stations, hereinafter) is calculated;

a seventh step, in which at least one of the number of the mobile stations having a data buffered time longer than a predetermined threshold value and the number of the logical channels of said mobile stations among the logical channels of the mobile stations (referred to as the number of the seventh mobile stations, hereinafter) is calculated;

an eighth step, in which at least one of the number of the mobile stations having data discarded due to delay among the plural mobile stations and the number of the logical channels of said mobile stations among the number of the logical channels of the mobile stations (referred to as the number of the eighth mobile stations, hereinafter) is calculated; and a ninth step, in which admission of a new mobile station is controlled in accordance with at least one of the number of the first mobile stations, the number of the second mobile stations, the number of the third mobile stations, the number of the fourth mobile stations, the number of the fifth mobile stations, the number of the sixth mobile stations, the number of the seventh mobile stations, and the number of the eighth mobile stations.

By configuring in such a manner, admission control of a newly generated call can be carried out in accordance with the number of the mobile stations that actually consume a radio resource.

A mobile communications system, according to an embodiment of the present invention, includes a base station apparatus that carries out communications with plural mobile stations using a shared channel;

a data server that stores data to be transmitted from the base station apparatus; and a monitor terminal device that outputs the data within the data server, wherein the base station apparatus comprises a first calculation section that calculates at least one of the number of the mobile stations having data to be transmitted through the shared channel in a downlink transmission buffer among the plural mobile stations and the number of the logical channels of said mobile stations among the logical channels of the mobile stations (referred to as the number of first mobile stations, hereinafter);

a second calculation section that calculates at least one of the number of the mobile stations having data to be transmitted through the shared channel in an uplink transmission buffer among the plural mobile stations and the number of the logical channels of said logical channels among the logical channels of the mobile stations (referred to as the number of second mobile stations, hereinafter);

a third calculation section that calculates the number of mobile stations that highly frequently carry out communications through the shared channel (referred to as the number of third mobile stations, hereinafter);

a fourth calculation section that calculates the number of mobile stations that less frequently carry out communications through the shared channel (referred to as the number of fourth mobile stations, hereinafter);

a fifth calculation section that calculates the number of the plural mobile stations (referred to as the number of fifth mobile stations, hereinafter);

a sixth calculation section that calculates at least one of the number of the mobile stations having a transmission rate less than a predetermined threshold value among the plural mobile stations and the number of the logical channels of said mobile stations among the logical channels of the mobile stations (referred to as the number of sixth mobile stations, hereinafter);

a seventh calculation section that calculates at least one of the number of the mobile stations having a data buffered time longer than a predetermined threshold value among the plural mobile stations and the number of the logical channels of said mobile stations among the logical channels of the mobile stations (referred to as the number of seventh mobile stations, hereinafter);

an eighth calculation section that calculates at least one of the number of the mobile stations having data discarded due to delay among the plural mobile stations and the number of the logical channels of said mobile stations among the number of the logical channels of the mobile stations (referred to as the number of eighth mobile stations, hereinafter);

a processing load measurement section that measures processing load;

a calculation section that calculates a transmission rate regarding one of the plural mobile stations and the logical channel of the mobile station;

another calculation section that calculations one of a buffered data amount and a data buffered time regarding the plural mobile stations and the logical channel of the mobile stations; and a reporting section that reports at least one of the number of the first mobile stations, the number of the second mobile stations, the number of the third mobile stations, the number of the fourth mobile stations, the number of the fifth mobile stations, the number of the sixth mobile stations, the number of the seventh mobile stations, the number of the eighth mobile stations, the processing load, the transmission rate, the buffered data amount, and the data buffered time, and wherein the data server comprises a storing section that stores as a statistical value at least one of the number of the first mobile stations, the number of the second mobile stations, the number of the third mobile stations, the number of the fourth mobile stations, the number of the fifth mobile stations, the number of the sixth mobile stations, the number of the seventh mobile stations, the number of the eighth mobile stations, the processing load, the transmission rate, the buffered data amount, and the data buffered time; and an output section that outputs to the monitor terminal device at least one of the number of the first mobile stations, the number of the second mobile stations, the number of the third mobile stations, the number of the fourth mobile stations, the number of the fifth mobile stations, the number of the sixth mobile stations, the number of the seventh mobile stations, the number of the eighth mobile stations, the processing load, the transmission rate, the buffered data amount, and the data buffered time as a statistical value.

Advantage of the Invention

According to an example of the present invention, a base station apparatus and a communications control method that are capable of calculating the number of mobile stations that actually consume a radio resource among mobile stations having connection established with the base station apparatus are provided.

In addition, according to an example of the present invention, a base station apparatus and a communications control method are provided that are capable of carrying out call admission control and selection of frequency band for carrying out communications, in accordance with the number of the mobile stations that actually consume a radio resource among mobile stations having connection established with the base station apparatus.

BRIEF DESCRIPTION OF THE DRAWINGS

FIG. 3A is an explanatory view illustrating eight discriminants according to an example of the present invention.

FIG. 3B is an explanatory view illustrating ten discriminants according to an example of the present invention.

LIST OF REFERENCE SYMBOLS

Figure 1:
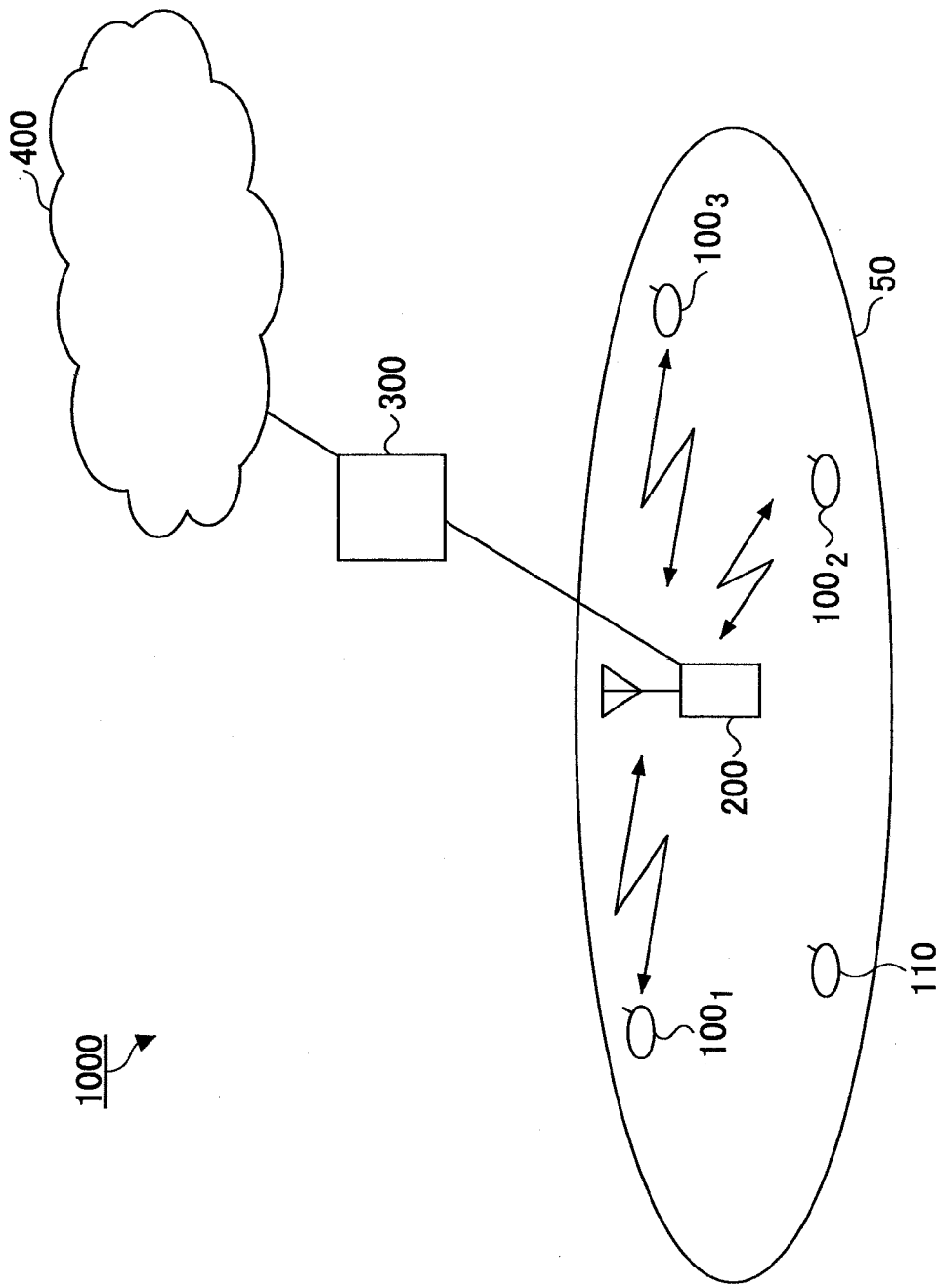
FIG. 1 is a block diagram illustrating a configuration of a radio communications system according to an example of the present invention.

50: cell
1001, 1002, 1003, 100n: mobile station
200: base station apparatus
202: transmission reception antenna
204: amplification section
206: transmission reception section
208: baseband processing section
210: call processing section
212: transmission path interface
2081: layer 1 processing section
2082: MAC processing section
2083: RLC processing section
2084: DL transmission power determining section
300: access gateway apparatus
400: core network 402: traffic aggregation server
404: monitor terminal

BEST MODE FOR CARRYING OUT THE INVENTION

Best modes for carrying out the present invention are explained based on the following examples referring to the drawings.

In all the drawings for explaining the examples, the same reference symbols are used for elements having the same function, and repetitive explanations are omitted.

Referring to FIG. 1, a radio communications system is explained to which a base station apparatus according to an example of the present invention is applied.

A radio communications system 1000, to which Evolved UTRA and UTRAN (another name: Long Term Evolution or Super 3G) is applied, includes a base station apparatus (eNB: eNodeB) 200 and plural mobile stations (UE: User Equipment) $100_n$ ($100_1$, $100_2$, $100_3$, ..., $100_n$, n: an integer more than zero), and 110. The base station apparatus 200 is connected to an upper layer station, for example, an access gateway apparatus 300, and the access gateway apparatus 300 is connected to a core network 400. The mobile $100_n$ carries out communications with the base station apparatus 200 in a cell 50 under Evolved UTRA and UTRAN. Namely, a connection between the mobile station 100n and the base station apparatus 200 is established, and the mobile station 100n is in the LTE active state. On the other hand, the mobile station 110 has not yet established connection with the base station apparatus 200 in the cell 50, and is about to start communications anew with the base station apparatus 200 using Evolved UTRA and UTRAN.

In the following, the mobile station apparatuses $100_1$, $100_2$, $100_3$, ..., $100_n$ are referred to as the mobile station $100_n$, unless otherwise noted, because they have the same configuration, function, and conditions. In addition, the mobile station 110 is used as an example of a mobile station that is about to start communications anew with the base station apparatus 200 using Evolved UTRA and UTRAN in the cell 50. Although only one mobile station 110 that is about to start communications anew with the base station apparatus 200 using Evolved UTRA and UTRAN in the cell 50 in FIG. 1, there may be two or more mobile stations 110.

The radio communications system 1000 employs Orthogonal Frequency Division Multiplexing (OFDM) for downlink, and Single-Carrier Frequency Division Multiple Access (SC-FDMA) for uplink as radio access methods. As stated above, in OFDM, a frequency band is divided into plural narrow frequency bands (sub-carriers), and data are placed on the respective divided frequency bands to carry out transmission. In SC-FDMA, a frequency band is divided, and different frequency bands are used by different terminal devices to carry out transmission, so that interference between the terminal devices can be reduced.

Communications channels in Evolved UTRA and UTRAN are explained in the following.

In downlink, a Physical Downlink Shared Channel (PDSCH) to be used in a shared manner by the mobile stations 100n and a downlink control channel for LTE are used. In downlink, transport format information and identification of a user to which the PDSCH is transmitted, transport format information and identification of a user to which a Physical Uplink Shared Channel (PUSCH) is transmitted, acknowledgement information of the PUSCH and the like are provided through the downlink control channel for LTE, and user data are transmitted through the PDSCH.

In uplink, the PUSCH to be used in a shared manner by the mobile stations 100n and an uplink control channel for LTE are used. The uplink control channel includes two types, i.e., a channel to be time-multiplexed in the PUSCH and a channel to be frequency-multiplexed in the PUSCH.

In uplink, downlink quality information (Channel Quality Indicator (CQI)) to be used for scheduling of physical shared channel in downlink and Adaptive Modulation Coding Scheme (AMCS), and acknowledge information (HARQ ACK information) of the PDSCH are transmitted through the uplink control channel for LTE.

In addition, user data are transmitted through the PUSCH.

Figure 2:
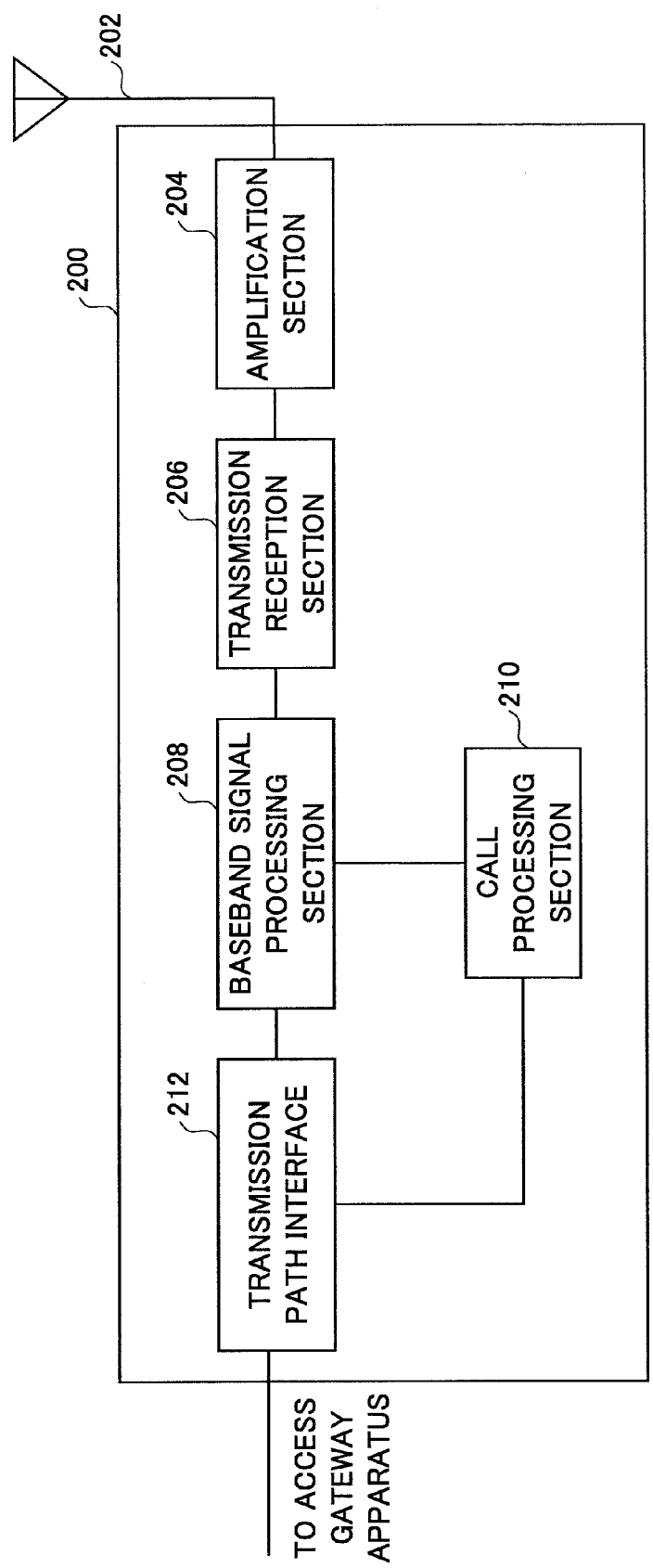
FIG. 2 is a partial block diagram illustrating a base station apparatus according to an example of the present invention.

Next, the base station apparatus 200 according to an example of the present invention is explained with reference to FIG. 2.

The base station apparatus 200 according to this example includes a transmission/reception antenna 202, an amplification section 204, a transmission/reception section 206, a baseband signal processing section 208, a call processing section 210, and a transmission path interface 212.

Packet data transmitted from the base station apparatus 200 to the mobile station $100_n$ in downlink are input to the baseband signal processing section 208 from the upper station positioned in an upper layer of the base station apparatus 200, for example the access gateway apparatus 300, via the transmission path interface 212.

In the baseband signal processing section 208, the packet data undergoes segmentation/concatenation; Radio Link Control (RLC) layer transmission processing such as RLC retransmission control and MAC retransmission control; transmission processing of, for example, Hybrid Automatic Repeat reQuest (HARQ), scheduling, transmission format selection, channel coding, and Inverse Fast Fourier Transform (IFFT) processing; and is forwarded to the transmission/reception section 206. In addition, PDCP layer processing may be carried out in the baseband signal processing section 208.

In the transmission/reception section 206, the baseband signal received from the baseband signal processing section 208 undergoes frequency conversion processing for converting to a radio frequency band, is amplified by the amplification section 204, and is transmitted from the transmission/reception antenna 202.

On the other hand, regarding data transmitted from the mobile station $100_n$ to the base station apparatus 200 in uplink, the radio frequency band signals received by the transmission/reception antenna 202 are amplified by the amplification section 204, frequency-converted into a baseband signal by the transmission/reception section 206, and input to the baseband signal processing section 208.

In the baseband signal processing section 208, the input baseband signal undergoes FFT processing, IDFT processing, error correction decoding, reception processing of the MAC retransmission control, reception processing of RLC layer and the like, and is forwarded to the access gateway apparatus 300 via the transmission path interface 212.

In addition, the baseband signal processing section 208 calculates the number of mobile stations having data to be transmitted through PDSCH in a downlink transmission buffer; the number of mobile stations having data to be transmitted through PUSCH in an uplink transmission buffer; the number of mobile stations that highly frequently carry out communications through the PDSCH and the PUSCH, which are shared channels; the number of mobile stations that less frequently carry out communications through the PDSCH and the PUSCH, which are shared channels; the number of mobile stations in the LTE Active state; and the number of mobile stations that do not satisfy a predetermined transmission rate among the mobile stations in the LTE Active state. In the following explanation, the number of the mobile stations having data to be transmitted through PDSCH in the downlink transmission buffer is called the "number of the first mobile stations"; the number of mobile stations having data to be transmitted through PUSCH in the uplink transmission buffer is called the "number of the second mobile stations"; the number of mobile stations that highly frequently carry out communications through the PDSCH and the PUSCH, which are shared channels, is called the "number of the third mobile stations"; the number of mobile stations that less frequently carry out communications through the PDSCH and the PUSCH, which are shared channels, is called the "number of the fourth mobile stations"; the number of mobile stations in the LTE Active state is called the "number of the fifth mobile stations"; and the number of mobile stations that do not satisfy a predetermined transmission rate among the mobile stations in the LTE Active state is called the "number of the sixth mobile stations".

Moreover, the baseband signal processing section 208 may calculate the number of mobile stations whose average data delay in uplink or downlink exceeds an allowable delay, or the number of mobile stations that experience data discarding due to delay in downlink takes place as described later, in addition to the number of the first mobile stations, the number of the second mobile stations, the number of the third mobile stations, the number of the fourth mobile stations, the number of the fifth mobile stations, and the number of the sixth mobile stations. The number of mobile stations whose average data delay in uplink or downlink exceeds a allowable delay, and the number of mobile stations that experience data discarding due to delay in downlink taking place are called the "number of the seventh mobile stations" and the "number of the eighth mobile stations", respectively.

The call processing section 210 carries out call processing such as establishment, release or the like of communications channels; resource assignment; and state management of the radio station 200.

The call processing section 210 receives the number of the first mobile stations, the number of the second mobile stations, the number of the third mobile stations, the number of the fourth mobile stations, the number of the fifth mobile stations, and the number of the sixth mobile stations from a mobile station number calculation section 2084 in a baseband signal processing section 208 described later. In addition, the call processing section 210 may receive the number of the seventh mobile stations, and the number of the eighth mobile stations, in addition to the number of the first mobile stations, the number of the second mobile stations, the number of the third mobile stations, the number of the fourth mobile stations, the number of the fifth mobile stations, and the number of the sixth mobile stations.

The call processing section 210 obtains a usage rate of a buffer, a usage rate of a memory, a usage rate of a central processing unit (CPU) of the own base station apparatus 200, and the like as a processing load of the own base station apparatus. Here, the buffer may be, for example, a buffer for data in a PDCP layer, a buffer for data in an RLC layer, or a buffer for data in an MAC layer. In addition, the processing load of the own base station apparatus, namely, the usage rate of the buffer, the usage rate of the memory, the usage rate of the central processing unit of the own base station apparatus, and the like, may be obtained after totalizing values of plural carriers, or obtained with respect to each carrier. Moreover, when the base station apparatus 200 has plural sectors, the processing load of the own base station apparatus may be obtained with respect to each cell.

Furthermore, the call processing section 210 may obtain a processing load of another node such as a node in the core network 400 and yet another node of the access gateway apparatus 300 and the like. The processing load is, for example, the usage rate of the CPU and the usage rate of the memory.

In addition, the call processing section 210 carries out a call admission determination process with respect to the mobile station 110 in accordance with at least one of the number of the first mobile stations, the number of the second mobile stations, the number of the third mobile stations, the number of the fourth mobile stations, the number of the fifth mobile stations, the number of the sixth mobile stations, the processing load of the own base station apparatus, and the processing load of another node.

For example, a first threshold value TH1, a second threshold value TH2, a third threshold value TH3, a fourth threshold value TH4, a fifth threshold value TH5, a sixth threshold value TH6, a seventh threshold value TH7, and an eighth threshold value TH8 may be defined, and it may be determined whether the mobile station 110 can start communications anew with the base station apparatus 200 in the cell 50 using Evolved UTRA and UTRAN from a relationship of the number of the first mobile stations, the number of the second mobile stations, the number of the third mobile stations, the number of the fourth mobile stations, the number of the fifth mobile stations, the number of the sixth mobile stations, the processing load of the own base station apparatus, and the processing load of another node with respect to the first threshold value TH1, the second threshold value TH2, the third threshold value TH3, the fourth threshold value TH4, the fifth threshold value TH5, the sixth threshold value TH6, the seventh threshold value TH7, and the eighth threshold value TH8, respectively.

For example, when at least one of eight discriminants shown in FIG. 3A is true, it may be determined that the mobile station 110 cannot start communications anew with the base station apparatus 200 using Evolved UTRA and UTRAN in the cell 50; and when all the eight discriminants shown in FIG. 3A are false, it may be determined that the mobile station 110 can start communications anew with the base station apparatus 200 using Evolved UTRA and UTRAN in the cell 50.

Alternatively, when all the eight discriminants shown in FIG. 3A are true, it may be determined that the mobile station 110 cannot start communications anew with the base station apparatus 200 using Evolved UTRA and UTRAN in the cell 50, and when at least one of the eight discriminants shown in FIG. 3A is false, it may be determined that the mobile station 110 can start communications anew with the base station apparatus 200 using Evolved UTRA and UTRAN in the cell 50.

Although all the eight discriminants are used in the above example, part of the eight discriminants may be used to carry out a similar determination.

Moreover, the call processing section 210 may carry out the call admission determination process with respect to the mobile station 110 in accordance with the number of the seventh mobile stations and the number of the eighth mobile stations in addition to the number of the first mobile stations, the number of the second mobile stations, the number of the third mobile stations, the number of the fourth mobile stations, the number of the fifth mobile stations, and the number of the sixth mobile stations. Namely, the call processing section 210 carries out the call admission determination process with respect to the mobile station 110 in accordance with at least one of the number of the first mobile stations, the number of the second mobile stations, the number of the third mobile stations, the number of the fourth mobile stations, the number of the fifth mobile stations, the number of the sixth mobile stations, the number of the seventh mobile stations and the number of the eighth mobile stations, the process load of the own base station apparatus, and the process load of another node.

For example, a ninth threshold value TH9, and a tenth threshold value TH10 may be further defined, and it may be determined whether the mobile station 110 can start communications anew with the base station apparatus 200 in the cell 50 using Evolved UTRA and UTRAN from a relationship of the number of the first mobile stations, the number of the second mobile stations, the number of the third mobile stations, the number of the fourth mobile stations, the number of the fifth mobile stations, the number of the sixth mobile stations, the processing load of the own base station apparatus, the processing load of another node, the number of the seventh mobile stations, and the number of the eighth mobile stations with respect to the first threshold value TH1, the second threshold value TH2, the third threshold value TH3, the fourth threshold value TH4, the fifth threshold value TH5, the sixth threshold value TH6, the seventh threshold value TH7, the eighth threshold value TH8, and the ninth threshold value TH9, and the tenth threshold value TH10, respectively.

For example, when at least one of the ten discriminants shown in FIG. 3B is true, it may be determined that the mobile station 110 cannot start communications anew with the base station apparatus 200 using Evolved UTRA and UTRAN in the cell 50, and when all the ten discriminants shown in FIG. 3B are false, it may be determined that the mobile station 110 can start communications anew with the base station apparatus 200 using Evolved UTRA and UTRAN in the cell 50.

Alternatively, when all the ten discriminants shown in FIG. 3B are true, it may be determined that the mobile station 110 cannot start communications anew with the base station apparatus 200 using Evolved UTRA and UTRAN in the cell 50, and when at least one of the ten discriminants shown in FIG. 3B is false, it may be determined that the mobile station 110 can start communications anew with the base station apparatus 200 using Evolved UTRA and UTRAN in the cell 50.

Alternatively, although all the ten discriminants are used in the above example, a part of the ten discriminants may be used to carry out the similar determination.

Regarding the number of the sixth mobile stations, the number of the seventh mobile stations, and the number of the eighth mobile stations, the numbers of mobile stations can be calculated regarding each of the uplink and the downlink. In this case, a value regarding the uplink and a value regarding the downlink may be calculated regarding each of the number of the sixth mobile stations, the number of the seventh mobile stations, and the number of the eighth mobile stations, and the determination using the discriminants shown in FIG. 3A or FIG. 3B may be carried out regarding each of the values. In the case of FIG. 3A, there are two discriminants regarding the number of the sixth mobile stations, which results in a total of nine discriminants. In the case of FIG. 3B, there are two additional discriminants regarding the number of the sixth mobile stations, the number of the seventh mobile stations, and the number of the eighth mobile stations, which results in a total of thirteen discriminants.

In addition, it may be determined whether the above mobile station 110 can start communications anew with the base station apparatus 200 using Evolved UTRA and UTRAN in the cell 50, with respect to each service type, or each contract type, or each terminal device type, each radio bearer, each logical channel, each priority class. In this case, the number of the first mobile stations through the number of the sixth mobile stations are calculated with respect to each service type, or each contract type, or each terminal device type, or each radio bearer, or each logical channel, or each priority class, and the first through the sixth threshold values TH1 through TH6 are defined with respect to each service type, or each contract type, or each terminal device type, or each radio bearer, or each logical channel, or each priority class, and thus such determination described above is carried out. Regarding the number of the seventh mobile stations and the number of the eighth mobile stations, the number of the seventh mobile stations and the number of the eighth mobile stations are calculated with respect to each service type, or each contract type, or each terminal type, or each radio bearer, or each logical channel; the above ninth threshold value TH9 and the tenth threshold value TH10 are defined with respect to each service type, or each contract type, or each terminal type, or each radio bearer, or each logical channel; and such determination described above is carried out.

When the determination described above is carried out by calculating the number of the first mobile stations through the number of the sixth mobile stations with respect to each logical channel and defining the first through the sixth threshold values TH1 through TH6, if the mobile station 110 has a logical channel with respect to which the determination result based on FIG. 3A is no good (NG), it may be determined that the mobile station 110 cannot start communications anew with the base station apparatus 200 using Evolved UTRA and UTRAN in the cell 50. Alternatively, it may be determined that the mobile station 110 cannot start communications anew with the base station apparatus 200 using Evolved UTRA and UTRAN in the cell 50, regardless of the mobile station 110 having or not having a logical channel with respect to which the determination result based on FIG. 3A is no good (NG).

Alternatively, when the above determination is carried out with respect to each logical channel in accordance with the number of the seventh mobile stations or the number of the eighth mobile stations in addition to the number of the first mobile stations through the number of the sixth mobile stations, if the mobile station 110 has a logical channel with respect to which the determination result based on FIG. 3B is no good (NG), it may be determined that the mobile station 110 cannot start communications anew with the base station apparatus 200 using Evolved UTRA and UTRAN in the cell 50. Alternatively, it may be determined that the mobile station 110 cannot start communications anew with the base station apparatus 200 using Evolved UTRA and UTRAN in the cell 50, regardless of the mobile station 110 having or not having a logical channel with respect to which the determination result based on FIG. 3B is no good (NG).

When the call processing section 210 determines that the mobile station 110 can start communications anew with the base station apparatus 200 using Evolved UTRA and UTRAN in the cell 50, the call processing section 210 carries out a process for allowing the mobile station 110 to start communications anew with the base station apparatus 200 using Evolved UTRA and UTRAN in the cell 50. Namely, the call processing section 210 provides the mobile station 110 with a control signal for allowing the mobile station 110 to start communications, and carries out setup of communications between the mobile station 110 and the base station apparatus 200. On the other hand, when the call processing section 210 determines that the mobile station 110 cannot start communications anew with the base station apparatus 200 using Evolved UTRA and UTRAN in the cell 50, the call processing section 210 does not carry out the process for allowing the mobile station 110 to start communications anew with the base station apparatus 200 using Evolved UTRA and UTRAN in the cell 50. In this case, call processing section 210 may provide the mobile station 110 with information indicating that the communications with the base station apparatus 200 using Evolved UTRA and UTRAN in the cell 50 cannot be carried out, instead of carrying out the process that allows the mobile station 110 to start communications anew with the base station apparatus 200 using Evolved UTRA and UTRAN in the cell 50. In this case, the call that the mobile station 110 tries to start results in a call loss.

In addition, when the call processing section 210 determines that the radio communications system 1000 has plural carriers and that the mobile station 110 can start communications anew with the base station apparatus 200 using Evolved UTRA and UTRAN in the cell 50, and carries out the above setup of the communications between the mobile station 110 and the base station apparatus 200, the call processing section 210 may specify a carrier through which the mobile station 110 carries out communications, in accordance with at least one of the number of the first mobile stations, the number of the second mobile stations, the number of the third mobile stations, the number of the fourth mobile stations, the number of the fifth mobile stations, the number of the sixth mobile stations, the number of the seventh mobile stations, the number of the eighth mobile stations, and the above processing load with respect to each carrier of the own base station apparatus.

For example, it is assumed that the radio communications system 1000 has two carriers, namely, a carrier #1 and a carrier #2. When the call processing section 210 determines that the mobile station 110 can start communications anew with the base station apparatus 200 using Evolved UTRA and UTRAN in the cell 50, the call processing section 210 may determine that the mobile station 110 can start communications anew with the base station apparatus 200 using Evolved UTRA and UTRAN in the cell 50 through one carrier that has a smaller number of the first mobile stations than the other. For example, when the number of the first mobile stations of the carrier #1 is 50 and the number of the first mobile stations of the carrier #2 is 100, it may be determined that the mobile station 110 carries out communications through the carrier #1 with the base station 200 using Evolved UTRA and UTRAN in the cell 50.

Although the number of the first mobile stations of the carrier #1 and the number of the first mobile stations of the carrier #2 are compared in the above example, the same determination may be made using the number of the second mobile stations, the number of the third mobile stations, the number of the fourth mobile stations, the number of the fifth mobile stations, the number of the sixth mobile stations, the number of the seventh mobile stations, the number of the eighth mobile stations, or the process load with respect to each carrier of the own base station apparatus. Alternatively, a similar determination as above may be made using plural ones of the number of the first mobile stations through the number of the eighth mobile stations. By controlling in such a manner, the number of mobile stations in the carrier #1 and the carrier #2 can be made equal.

In addition, which carrier is used by the mobile station 110 when carrying out communications with the base station apparatus 200 using Evolved UTRA and UTRAN in the cell 50 may be determined with respect to each service type, or each contract type, or each terminal device type, each radio bearer, each logical channel, or each priority class. In this case, the number of the first mobile stations through the number of the eighth mobile stations are calculated with respect to each service type, or each contract type, or each terminal device type, each radio bearer, each logical channel, or each priority class, and the determination described above is carried out.

Although it is shown that the mobile station 110 starts communications anew with the base station apparatus 200 using Evolved UTRA and UTRAN in the cell in the above example, a carrier that the mobile station 110 camps on (remains in an area of or awaits with) in idle state after communications are completed may be specified when the mobile station 110 completes the communications with the base station apparatus 200 using Evolved UTRA and UTRAN in the cell 50, in accordance with at least one of the number of the first mobile stations, the number of the second mobile stations, the number of the third mobile stations, the number of the fourth mobile stations, the number of the fifth mobile stations, the number of the sixth mobile stations, the number of the seventh mobile stations, the number of the eighth mobile stations, and the above processing load with respect to each carrier of the own base station apparatus.

For example, it is assumed that the radio communications system 1000 has two carriers, namely, the carrier #1 and the carrier #2. When the call processing section 210 determines that the mobile station 110 completes communications that have been carried out with the base station apparatus 200 using Evolved UTRA and UTRAN in the cell, the call processing section 210 determines that the mobile station 110 in an idle state after the communications camps on (remains in the area of) one carrier with a smaller number of the first mobile stations than the other. For example, when the number of the first mobile stations of the carrier #1 is 50 and the number of the first mobile stations of the carrier #2 is 100, it may be determined that the mobile station 110 in the idle state after the communications camps on (remains in the area of) the carrier #1.

More specifically, when the base station apparatus 200 completes communications with the mobile station 110, the base station apparatus 200 specifies a carrier on which the mobile station 110 camps by providing the mobile station 110 with a frequency and a cell ID on which the mobile station 110 should camp. The frequency and the cell ID on which the mobile station 110 should camp may be included in a message for indicating the completion of the communications, for example.

Although the number of the first mobile stations of the carrier #1 and the number of the first mobile stations of the carrier #2 are compared in the above example, a similar determination may be made using the number of the second mobile stations, the number of the third mobile stations, the number of the fourth mobile stations, the number of the fifth mobile stations, the number of the sixth mobile stations, the number of the seventh mobile stations, the number of the eighth mobile stations, or the process load with respect to each carrier of the own base station apparatus. Alternatively, a similar determination as above may be made using plural ones of the number of the first mobile stations through the number of the eighth mobile stations and the processing load with respect to each carrier of the own base station apparatus. By controlling in such a manner, the number of mobile stations in the carrier #1 and the carrier #2 can be made equal.

In addition, which carrier the mobile station 110 camps on (remains in the area of) after completion of the communications may be determined with respect to each service type, or each contract type, or each terminal device type, each radio bearer, each logical channel, or each priority class. In this case, the number of the first mobile stations through the number of the eighth mobile stations are calculated with respect to each service type, or each contract type, or each terminal device type, each radio bearer, each logical channel, or each priority class, and the determination described above is carried out.

Figure 10:
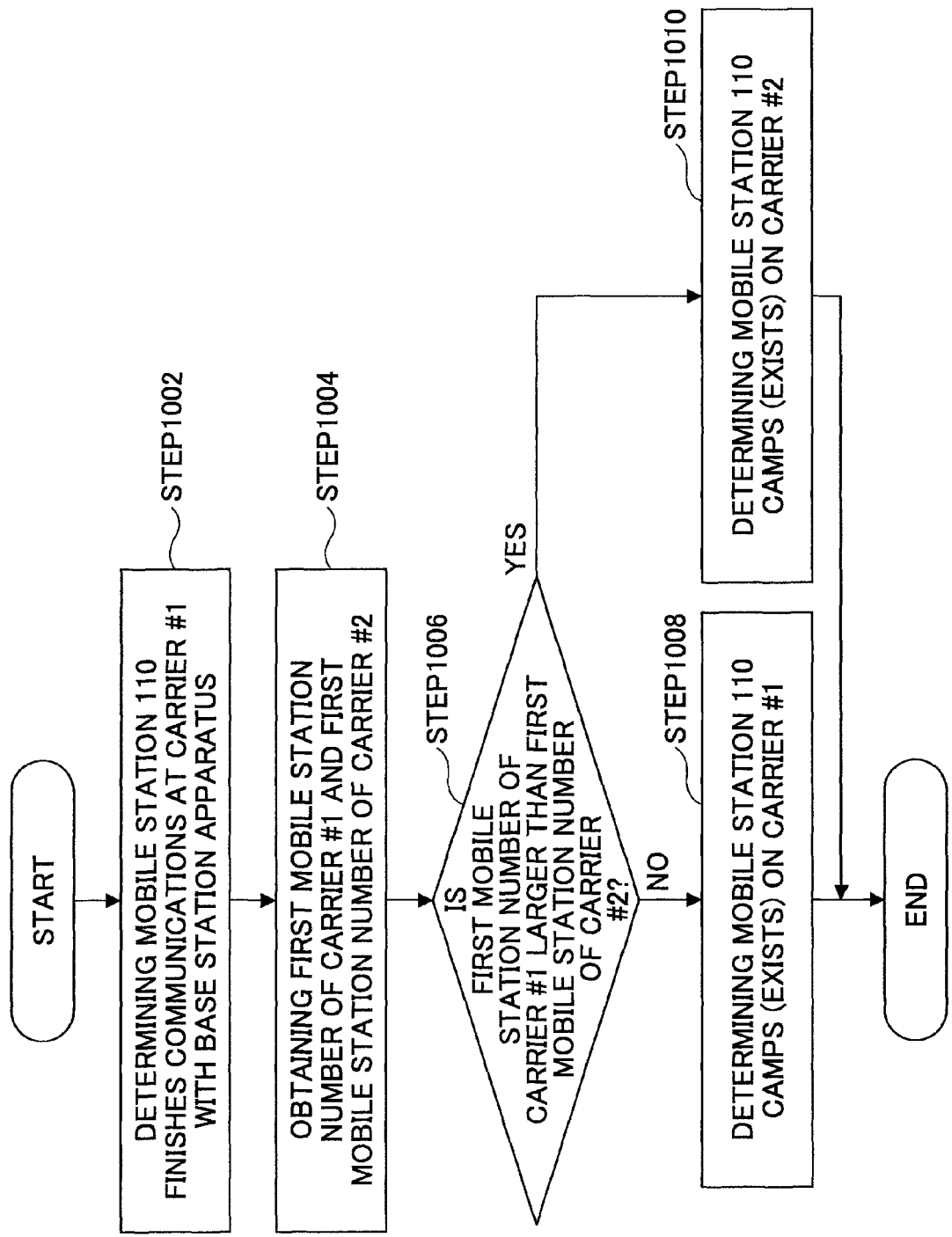
FIG. 10 is a flowchart illustrating a communications control method according to an example of the present invention.

Operations for determining the carrier to be camped on when there are plural carriers are explained later with reference to FIG. 10.

The call processing section 210 may aggregate the number of the first mobile stations, the number of the second mobile stations, the number of the third mobile stations, the number of the fourth mobile stations, the number of the fifth mobile stations, the number of the sixth mobile stations, the number of the seventh mobile stations, the number of the eighth mobile stations, and the processing load of the own base station apparatus, which are received from the mobile station number calculation section 2084 in the baseband signal processing section 208, and report the result to a traffic aggregation server 402 in the core network 400 via the transmission path interface 212. At this time, a spontaneous value may be reported or a value averaged over a predetermined averaging period may be reported as the number of the first mobile stations, the number of the second mobile stations, the number of the third mobile stations, the number of the fourth mobile stations, the number of the fifth mobile stations, the number of the sixth mobile stations, the number of the seventh mobile stations, the number of the eighth mobile stations, and the processing load with respect to each carrier of the own base station apparatus. For example, when a value averaged over three minutes is reported, a value obtained by averaging the number of the first mobile stations, the number of the second mobile stations, the number of the third mobile stations, the number of the fourth mobile stations, the number of the fifth mobile stations, the number of the sixth mobile stations, the number of the seventh mobile stations, the number of the eighth mobile stations, and the processing load with respect to each carrier of the own base station apparatus over three minutes, respectively, and is reported to the traffic aggregation server 402.

The traffic aggregation server 402 can be accessed by a remote monitor terminal 404, and a network operator can monitor the degree of congestion in the cell 50 by monitoring the number of the first mobile stations, the number of the second mobile stations, the number of the third mobile stations, the number of the fourth mobile stations, the number of the fifth mobile stations, the number of the sixth mobile stations, the number of the seventh mobile stations, the number of the eighth mobile stations, and the processing load with respect to each carrier of the own base station apparatus. For example, when it is determined from the monitoring result of the degree of congestion in the cell that the degree of congestion in the cell 50 is permanently high or that the largest degree of congestion in the cell in one day exceeds the cell capacity, facility enhancement such as an increase of the number of carriers in the cell, an increase of the number of cells, or enlargement of a carrier bandwidth of the cell can be made.

In addition, the call processing section 210 may receive the transmission rate in the PDCP layer, the RLC layer, or the MAC layer regarding the uplink or the downlink of the mobile station 100n from the mobile number calculation portion 2084, aggregate the transmission rate in the PDCP layer, the RLC layer, or the MAC layer regarding the uplink or the downlink of the mobile station 100n, and report the result to the traffic aggregation server 402 in the core network 400 via the transmission interface 212. At this time, a spontaneous value may be reported, or a value averaged over a predetermined averaging period may be reported as the transmission rate in the PDCP layer, the RLC layer, or the MAC layer regarding the uplink or the downlink of the mobile station 100n. For example, when a value averaged over three minutes is reported, a value obtained by averaging the transmission rate in the PDCP layer, the RLC layer, or the MAC layer regarding the uplink or the downlink of the mobile station 100n over three minutes, respectively, is reported to the traffic aggregation server 402. Alternatively, an averaged transmission rate in the PDCP layer, the RLC layer, or the MAC layer regarding the uplink or the downlink regarding all the mobile stations in the cell may be reported, or a total value of the transmission rates in the PDCP layer, the RLC layer, or the MAC layer regarding the uplink or downlink regarding all the mobile stations in the cell 50. By reporting the averaged value or the total value regarding all the mobile stations, it becomes possible to monitor communication quality or a degree of congestion in the entire cell.

In addition, the call processing section 210 may receive a buffered time of downlink packet data from the mobile station number calculation section 2084, aggregate a buffered amount or the buffered time of the downlink packet data of the mobile station 100n, and report the result to the traffic aggregation server 402 in the core network 400 via the transmission interface 212. At this time, a spontaneous value may be reported, or a value averaged over a predetermined averaging period may be reported as the buffered amount or the buffered time of the downlink packet data of the mobile station 100n. For example, when a value averaged over three minutes is reported, a value obtained by averaging the buffered amount or the buffered time of the downlink packet data of the mobile station 100n over three minutes, respectively, is reported to the traffic aggregation server 402. Alternatively, an averaged value of the buffered amount or the buffered time of the downlink packet data regarding all the mobile stations in the cell may be reported. By reporting the averaged value regarding all the mobile stations, it becomes possible to monitor communication quality or a degree of congestion in the entire cell.

The traffic aggregation server 402 can be accessed by a remote monitor terminal 404, and a network operator can monitor the communications quality or the degree of congestion in the cell by monitoring the transmission rate in the PDCP layer, the RLC layer, or the MAC layer regarding the uplink or the downlink stored in the traffic aggregation server 402 from the remote monitor terminal 404. For example, when it is determined from the monitoring result of the degree of congestion in the cell that the degree of congestion in the cell 50 is permanently high or that the highest degree of congestion in the cell in one day exceeds a cell capacity, facility enhancement such as an increase of the number of carriers in the cell, an increase of the number of cells, or enlargement of a carrier bandwidth of the cell can be made.

Figure 4:
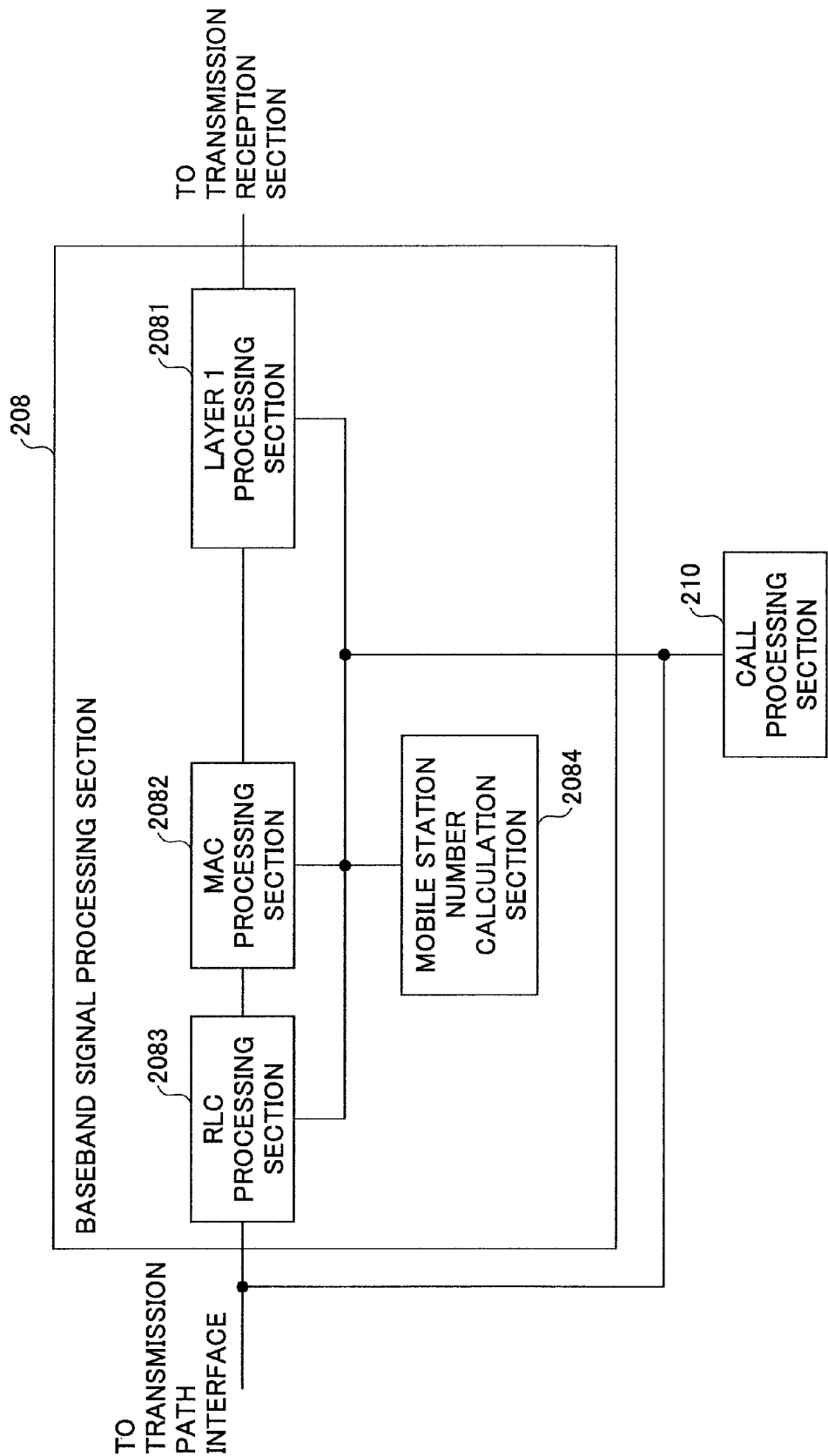
FIG. 4 is a partial block diagram illustrating a baseband signal processing section of a base station apparatus according to an example of the present invention.

Next, a configuration of the baseband signal processing section 208 is explained with reference to FIG. 4.

The baseband signal processing section 208 includes a layer 1 processing section 2081, a Medium Access Control (MAC) processing section 2082, an RLC processing section 2083, and the mobile station number calculation section 2084.

The layer 1 processing section 2081, the MAC processing section 2082, the RLC processing section 2083, and the mobile station number calculation section 2084 in the baseband signal processing section 208, and the call processing section 210 are connected with one another.

The layer 1 processing section 2081 carries out IFFT processing and channel coding of the data transmitted in downlink, and FFT processing and channel decoding of the data transmitted in uplink and the like.

The MAC processing section 2082 carries out the downlink data MAC retransmission control, transmission processing of, for example, the Hybrid Automatic Repeat reQuest (HARQ), scheduling, transmission format selection, and the like. In addition, the MAC processing section 2082 carries out reception processing and the like of the uplink MAC retransmission control.

Moreover, the MAC processing section 2082 obtains information that indicates an uplink transmission buffer status in the mobile station 100n and is reported from the mobile station 100n, and reports the uplink transmission buffer state in the mobile station 100n to the mobile station calculation section 2084. Here, the information that indicates an uplink transmission buffer state in the mobile station 100n and is reported from the mobile station 100n is called, for example, a Buffer Status Report, and includes as an information element an absolute value of a buffered data amount in the uplink transmission buffer in the mobile station 100n, or a relative value with respect to a predetermined value. In addition, the uplink transmission buffer status in the mobile station 100n, which is reported from the MAC processing section 2082 to the mobile station number calculation section 2084, means the absolute value of the buffered data amount in the uplink transmission buffer in the mobile station 100n, or the relative value with respect to a predetermined value.

In addition, the Buffer Status Report may include absolute values of the buffered data amount for two or more prioritized groups, or a relative value with respect to a predetermined value. Alternatively, the Buffer Status Report may include an absolute value of the buffered data amount for one or more prioritized groups, or a relative value with respect to a predetermined value, or an absolute value of the buffered data amount regarding all the data, or a relative value with respect to a predetermined value. Moreover, the Buffer Status Report is reported, for example, from the mobile station 110n to the base station apparatus 200 as control information in the MAC layer.

In addition, the MAC processing section 2082 measures the transmission rate of the MAC layer in uplink and downlink regarding the mobile station 100n, and provides the mobile station number calculation section 2084 with the transmission rate of the MAC layer in uplink and downlink regarding the mobile station 100n.

The transmission rate of the MAC layer in uplink and downlink regarding the mobile station 100n may be a spontaneous value at the measurement timing, or a value averaged over a predetermined averaging period before the measurement timing. In addition, an averaging method may be a simple arithmetic averaging, or an averaging using a forgetting coefficient. Moreover, the transmission rate of the MAC layer in uplink and downlink regarding the mobile station 100n may be a spontaneous value sampled at predetermined sampling periods, or an averaged value of the sampled spontaneous values.

More specifically, an averaged value or a total value over a predetermined time period, for example, 100 ms may be calculated, and a value after filtering the above averaged value or the total value using the following expression may be measured as the transmission rate of the MAC layer.

$$F_n=(1-a)*F_{n-1}+a*M_n \quad \text{Expression:}$$

$F_n$: an updated value after filtering
$F_{n-1}$: an old value after filtering
a: filtering coefficient
$M_n$: the averaged value or the total value over a predetermined time period, for example, 100 ms A value of "a" may be set to, for example, $\frac{1}{2}^{(k/2)}$ (k=0, 1, 2, ... ). In addition, the above predetermined time period may be a value other than 100 ms, for example, 200 ms, or 80 ms, and set to be various other values.

Figure 8:
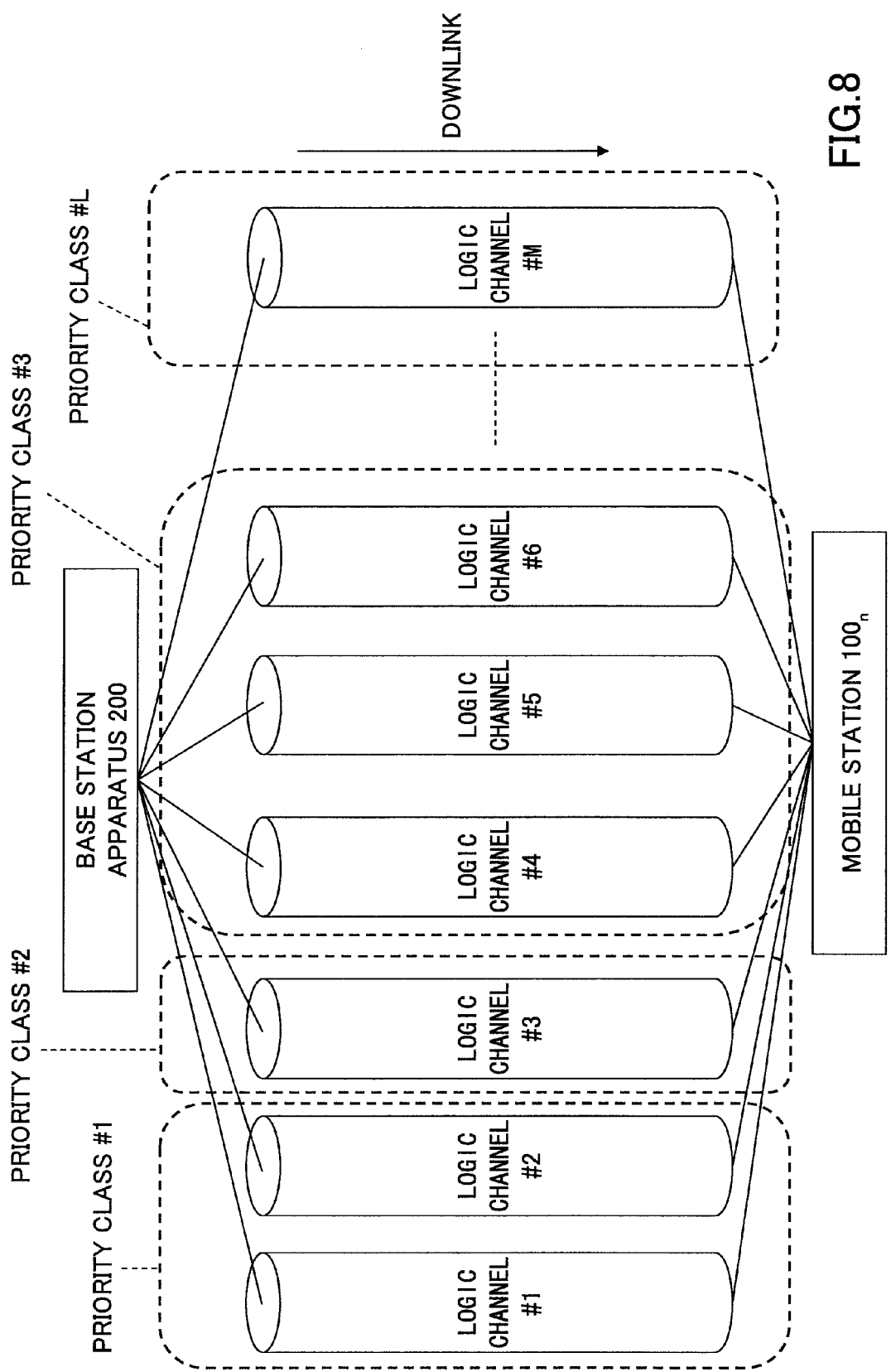
FIG. 8 exemplifies a relationship between a logical channel and a priority class.
Figure 9:
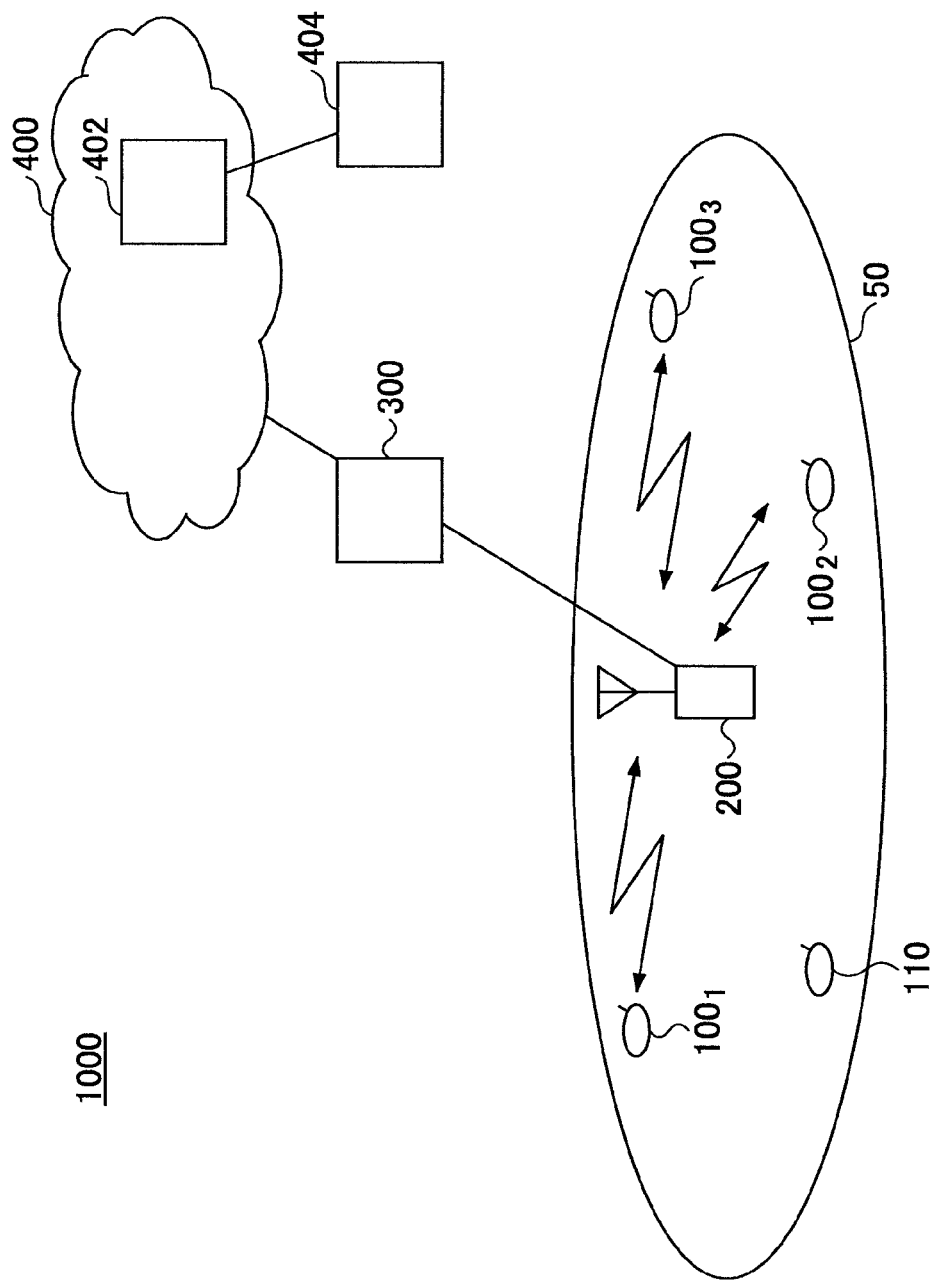
FIG. 9 is a block diagram illustrating a configuration of a radio communications system according to an example of the present invention.

Generally, plural logical channels are used in communications between the mobile station 100n and the base station apparatus 200. In addition, a priority class is defined for the plural logical channels. FIG. 8 illustrates an example of a relationship between the logical channels and the priority class. In the figure, M logical channels and L priority classes are set in downlink. The same setting is possible in uplink.

Here, the MAC processing section 2082 may measure a transmission rate of the logical channel to be used in communications with the mobile station 100n in the MAC layer, or a value obtained by averaging or totaling in the logical channel having the same priority class the transmission rate of the logical channel to be used in communications with the mobile station 100n in the MAC layer. The transmission rate of the logical channel, or the value obtained by averaging or totaling the transmission rate of the logical channel is provided to the mobile station number calculation section 2084. The above value is measured in both uplink and downlink.

In addition, the MAC processing section 2082 manages whether the mobile station 100n is in the DRX state, and provides the mobile station number calculation section 2084 with the information on whether the mobile station 100n is in the DRX state.

Moreover, the MAC processing section 2082 receives from the RLC processing section 2083 an incoming time of the downlink packet data sent from the upper layer station to the base station apparatus 200. The MAC processing section 2082 measures the buffered time of the downlink packet data regarding the mobile station 100n. Here, the buffered time of the downlink packet data means, for example, a buffered time of data in the base station apparatus 200, and more specifically, a time from the incoming time of the downlink packet data until when the base station apparatus 200 transmits the downlink packet data to the mobile station 100n using the downlink shared channel. Alternatively, the buffered time of the downlink packet data may be defined as a time from the incoming time of the downlink packet data until when the base station apparatus 200 transmits the downlink packet data to the mobile station 100n using the downlink shared channel and further ACK as acknowledgement information is received, in order to measure a time until the fact is confirmed that the mobile station 100n properly receives the packet data. The acknowledgement information may be for the MAC layer, or the RLC layer. Alternatively, the acknowledgement information may be for the PDCP layer. The MAC processing section 2082 may calculate a value obtained by averaging the buffered time regarding each packet data as the downlink packet data buffered time. The MAC processing section 2082 provides the mobile station number calculation section 2084 with the downlink packet data buffered time regarding the mobile station 100n.

In addition, the MAC processing section 2082 measures the buffered time of the uplink packet data of the mobile station 100n. Here, the buffered time of the uplink packet data of the mobile station 100n is a buffered time of data in the mobile station 100n. The MAC processing section 2082 may define the buffered time of the data, for example, as a time from when the MAC processing section 2082 receives the Buffer Status Report from the mobile station 100n until when the MAC processing section 2082 actually directs the transmission of the uplink shared channel through the UL Scheduling Grant to the mobile station 100n, because it is difficult to accurately ascertain the buffer state in the mobile station 100n. Alternatively, the buffered time of the uplink packet data may be defined as a time from when the Buffer Status Report is received from the mobile station 100n until the transmission of the uplink shared channel is directed to the mobile station 100n through the UL Scheduling Grant and the uplink shared channel is properly received, in order to measure a time until the fact is assured that the base station apparatus 200 properly receives the packet data. The MAC processing section 2082 may calculate a value obtained by averaging the buffered time regarding each data packet as the buffered time of the uplink packet data. The MAC processing section 2082 provides the mobile station number calculation section 2084 with the buffered time of the uplink packet data.

The RLC processing section 2083 carries out RLC layer transmission processing regarding the downlink packet data such as segmentation/concatenation, transmission processing of the RLC retransmission control and the like, and RLC layer reception processing regarding the uplink data such as segmentation/concatenation, the RLC retransmission control, and the like.

The RLC processing section 2083 measures the transmission rate of the RLC layer in downlink and uplink regarding the mobile station 100n, and provides the mobile station number calculation section 2084 with the transmission rate of the RLC layer in downlink and uplink regarding the mobile station 100n.

The transmission rate of the RLC layer in uplink and downlink regarding the mobile station 100n may be a spontaneous value at the measurement timing, or a value averaged over a predetermined averaging period before the measurement timing. In addition, an averaging method may be a simple arithmetic averaging, or an averaging using a forgetting coefficient. Moreover, the transmission rate of the MAC layer in uplink and downlink regarding the mobile station 100n may be a spontaneous value sampled at predetermined sampling periods, or an averaged value of the sampled spontaneous values.

More specifically, the average value or the total value may be measured over a predetermined time period, for example, 100 ms, and a value ($F_n$) after filtering using the following expression may be measured as the RLC layer transmission rate.

$$F_n=(1-a)*F_n-1+a*M_n \quad \text{Expression}$$

$F_n$: an updated value after filtering
$F_{n-1}$: a value after old filtering
a: filtering coefficient
$M_n$: the average value or the total value over a predetermined time period, for example, 100 ms A value of "a" may be set to, for example, $\frac{1}{2}^{(k/2)}$ (k=0, 1, 2, ... ). In addition, the above predetermined time period may be 200 ms, 80 ms, or other various values rather than 100 ms.

The RLC processing section 2083 may measure the average value or the total value obtained by averaging or totaling the transmission rates in the RLC layer of the logical channel to be used to carry out communication with the mobile station 100n within the logical channels having the same priority class, instead of measuring the transmission rate in the RLC layer of the mobile station 100n. In addition, the transmission rate of the logical channel, or the averaged value or the total value obtained by averaging or totaling the logical channel transmission rates within the logical channels having the same priority class is provided to the mobile station number calculation section 2084. This value is measured at both uplink and downlink.

Moreover, the RLC processing section 2083 provides a transmission buffer state in the downlink RLC layer regarding the mobile station 100n to the mobile station number calculation section 2084. The transmission buffer state in the downlink RLC layer regarding the mobile station 100n is the buffered time or the buffered amount of the packet data in the RLC layer.

When the RLC processing section 2083 provides the transmission buffer state in the downlink RLC layer regarding the mobile station 100n, the RLC processing section 2083 may provide the transmission buffer state in the RLC layer with respect to each logical channel to be used for communications with the mobile station 100n.

Moreover, the RLC processing section 2083 monitors the incoming time of the downlink packet data regarding the mobile station 100n, the data being sent to the base station apparatus 200 from the upper station, and provides the incoming time of each data packet to the MAC processing section 2082.

In addition, the RLC processing section 2083 may have a function to discard the downlink packet data that have buffered for more than a predetermined allowable delay time in the RLC layer transmission buffer. In this case, the RLC processing 2083 may discard the downlink packet data that have buffered for more than a predetermined allowable delay time in the RLC layer transmission buffer, and provide the mobile station number calculation section 2084 with information on the destination mobile station of the discarded packet data.

While the RLC processing section 2083 carries out the RLC layer processing in the above example, the RLC processing section 2083 may carry out the PDCP layer processing in addition to or instead of the RLC layer processing.

In this case, the RLC processing section 2083 may measure the transmission rate of the PDCP layer and provide the mobile station number calculation section 2084 with the transmission rate, in addition to the RLC layer transmission rate regarding the mobile station 100n or regarding the logical channel to be used for communications with the mobile station 100n.

Alternatively, the RLC processing section 2083 may provide the mobile station number calculation section 2084 with the transmission buffer state of the downlink PDCP layer, in addition to the transmission buffer state of the downlink RLC layer regarding to the mobile station 100n or the logical channel to be used for communications with the mobile station 100n.

Alternatively, the RLC processing section 2083 may discard the downlink packet data that have buffered for more than a predetermined allowable delay in the transmission buffer of the PDCP layer, instead of discarding the downlink packet data that have buffered for more than a predetermined allowable delay in the transmission buffer of the RLC layer. In this case, the RLC processing section 2083 may discard the downlink packet data that have buffered for more than a predetermined allowable delay in the transmission buffer of the PDCP layer, and provide the mobile station number calculation section 2084 with information on the destination mobile station of the discarded packet data.

The RLC processing section 2083 may monitor a sequence number of the uplink PDCP layer, and provide the mobile station number calculation section 2084 with sequence number non-continuity when the sequence number non-continuity takes place.

The mobile station number calculation section 2084 receives the uplink transmission buffer state in the mobile station 100n, the transmission rate of the MAC layer in uplink and downlink regarding the mobile station 100n, and the information on whether the mobile station 100n is in the DRX state from the MAC processing section 2082; and the transmission rate of the PDCP layer or the transmission rate of the RLC layer in uplink and downlink regarding the mobile station 100n; and the transmission buffer state of the PDCP layer or the RLC layer in downlink regarding the mobile station 100n from the RLC processing section 2083.

In addition, the mobile station number calculation section 2084 receives the buffered time of the uplink and downlink packet data regarding the mobile station 100n from the MAC processing section 2082. Moreover, the mobile station number calculation section 2084 receives from the RLC processing section 2083 the information on the destination mobile station of the packet data discarded in the transmission buffer of the RLC layer or the PDCP layer.

The mobile station number calculation section 2084 calculates the number of the first mobile stations, the number of the second mobile stations, the number of the third mobile stations, the number of the fourth mobile stations, the number of the fifth mobile stations, and the number of the sixth mobile stations in accordance with the uplink transmission buffer state in the mobile station 100n, the transmission rate of the MAC layer in uplink and downlink regarding the mobile station 100n, the information on whether the mobile station 100n is in the DRX state, the transmission rate of the PDCP layer or the transmission rate of the RLC layer in uplink and downlink regarding the mobile station 100n, and the transmission buffer state of the PDCP layer or the RLC layer in downlink regarding the mobile station 100n. In addition, the mobile station number calculation section 2084 calculates the number of the seventh mobile stations in accordance with the packet data buffered time of the downlink and the uplink regarding the mobile station 100n. Moreover, the mobile station number calculation section 2084 calculates the number of the eighth mobile stations in accordance with the information on the destination mobile station of the packet data discarded in the RLC layer or the PDCP layer transmission buffer.

For example, the mobile station number calculation section 2084 may calculate the number of mobile stations in which buffered data amount in the RLC layer or the PDCP layer is more than or equal to a predetermined threshold value as the number of mobile stations having data to be transmitted through the PDSCH in the downlink transmission buffer, which is the number of the first mobile stations, in accordance with the transmission buffer state of the PDCP layer or the RLC layer in downlink regarding the mobile station 100n. The predetermined threshold value may be 0 KB, or a value other than 0 such as 10 KB. In addition, the buffered data amount may be a spontaneous value at the measurement timing, or a value averaged over a predetermined averaging period before the measurement timing. Moreover, the averaging method may be a simple arithmetic averaging, or an averaging using a forgetting coefficient. Furthermore, the buffered data amount may be a spontaneous value sampled at predetermined sampling periods, or an averaged value of the sampled spontaneous values.

More specifically, the average value or the total value may be measured over a predetermined time period, for example, 100 ms, and a value ($F_n$) after filtering using the following expression may be measured as the buffer buffered amount.

$$F_n = (1-a)*F_{n-1} + a*M_n \quad \text{Expression}$$

$F_n$: an updated value after filtering
$F_{n-1}$: a value after old filtering
a: filtering coefficient
$M_n$: the average value or the total value over a predetermined time period, for example, 100 ms A value of "a" may be set to, for example, $\frac{1}{2}^{(k/2)}$ (k=0, 1, 2, ...). In addition, the above predetermined time period may be 200 ms, 80 ms, or other various values rather than 100 ms.

Alternatively, the mobile station number calculation section 2084 may calculate the number of mobile stations whose data buffered time in the RLC layer or the PDCP layer is more than or equal to a predetermined threshold value as the number of mobile stations having data to be transmitted through the PDSCH in the downlink transmission buffer, which is the number of the first mobile stations, in accordance with the transmission buffer state of the PDCP layer or the RLC layer in downlink regarding the mobile station 100n. The predetermined threshold value may be 0 ms, or a value other than 0 such as 10 ms. In addition, the buffer buffered time may be a spontaneous value at the measurement timing, or a value averaged over a predetermined averaging period before the measurement timing. Moreover, an averaging method may be a simple arithmetic averaging, or an averaging using a forgetting coefficient. Furthermore, the data buffered time may be a spontaneous value sampled at predetermined sampling periods, or an averaged value of the sampled spontaneous values.

More specifically, the average value or the total value may be measured over a predetermined time period, for example, 100 ms, and a value ($F_n$) after filtering using the following expression may be measured as the data buffered time.

$$F_n = (1-a)*F_{n-1} + a*M_n \quad \text{Expression}$$

$F_n$: an updated value after filtering
$F_{n-1}$: a value after old filtering
a: filtering coefficient
$M_n$: the average value or the total value over a predetermined time period, for example, 100 ms A value of "a" may be set to, for example, $\frac{1}{2}^{(k/2)}$ (k=0, 1, 2, ...). In addition, the above predetermined time period may be 200 ms, 80 ms, or other various values rather than 100 ms.

In addition, the forgetting coefficient and the averaging period for averaging, the threshold value, and the like may be set as parameters.

Furthermore, the mobile station number calculation section 2084 may calculate the number of mobile stations having data to be transmitted through the PDSCH in the downlink transmission buffer, in accordance with a summation of the buffered data amount in the RLC layer and the buffered data amount in the MAC layer. Alternatively, the mobile station number calculation section 2084 may calculate the number of mobile stations having data to be transmitted through the PDSCH in the downlink transmission buffer, in accordance with a summation of the buffered data amount in the PDCP layer, the buffered data amount in the RLC layer, and the buffer buffered amount in the MAC layer. The buffered data amount in the MAC layer means, for example, data waiting to be retransmitted by HARQ in the MAC layer.

In addition, the number of mobile stations subjected to the user selection in the scheduling process in the MAC processing section 2082 may be calculated as the number of mobile stations having data to be transmitted through the PDSCH in the downlink transmission buffer, which is the number of the first mobile stations.

Here, a mobile station that satisfies all the following requirements is the mobile station subjected to the user selection in the scheduling processing.

(Requirement 1) there are data to be transmitted through the PDSCH (Requirement 2) a time frame when the downlink shared channel is transmitted or a time frame when acknowledgement information with respect to the shared channel is received is not overlapped with the time period when measurements for cells of different frequencies are carried out in the mobile station (Requirement 3) not in a sleep condition of DRX (Requirement 4) the transmission window of the RLC layer is not in Stall state However, even when the above requirements 1 through 4 are satisfied, a process may be carried out that does not consider a mobile station that just moves into the cell 50 by handover as the mobile station subjected to the user selection in the scheduling until data forwarding from the original base station and the Status Report of the PDCP layer are received.

Alternatively, when determining whether the above requirement 1 is satisfied, if the mobile station is or is being directed to handover to different base stations, a process may be carried out that considers only a control signal (DCCH) as data to be transmitted, and does not consider the other signals, for example, user data (DTCH) as data to be transmitted.

Alternatively, when determining whether the above requirement 1 is satisfied, if the uplink synchronization of the mobile station is not established, a process may be carried out that considers the control signal (DCCH) as data to be transmitted, and does not consider the other signals, for example, the user data (DTCH) as data to be transmitted.

In addition, the mobile station number calculation section 2084 may calculate the number of the first mobile stations with respect to each logical channel, as described later. In this case, the calculation of the number of the mobile stations is carried out with respect to the logical channel. Namely, the mobile station number calculation section 2084 calculates the number of the logical channels.

Alternatively, the mobile station number calculation section 2084 may calculate the number of the first mobile stations with respect to each priority class, as described later. In this case, the calculation of the mobile station number is carried out with respect to the logical channels belonging to corresponding priority classes. Namely, the mobile station number calculation section 2084 calculates the number of the logical channels belonging to corresponding priority classes.

For example, the mobile station number calculation section 2084 may calculate the number of mobile stations whose buffered data amount in the uplink transmission buffer is more than or equal to a predetermined threshold value as the number of mobile stations having data to be transmitted through the PUSCH in the uplink transmission buffer, which is the number of the second mobile stations, in accordance with the uplink transmission buffer state in the mobile station 100n. The predetermined threshold value may be 0 KB, or a value other than 0 such as 10 KB. In addition, the buffered data amount may be a spontaneous value at the measurement timing, or a value averaged over a predetermined averaging period before the measurement timing. Moreover, an averaging method may be a simple arithmetic averaging, or an averaging using a forgetting coefficient. Furthermore, the buffered data amount may be a spontaneous value sampled at predetermined sampling periods, or an averaged value of the sampled spontaneous values.

More specifically, the averaged value or the total value over a predetermined time period, for example, 100 ms is calculated, and a value after filtering the above averaged value or the total value using the following expression may be measured as the buffered data amount.

$$F_n = (1-a)*F_{n-1} + a*M_n \qquad \text{Expression:}$$

$F_n$: an updated value after filtering
$F_{n-1}$: an old value after filtering
a: filtering coefficient
$M_n$: the averaged value or the total value over a predetermined time period, for example, 100 ms A value of "a" may be set to, for example, $\frac{1}{2}^{(k/2)}$ (k=0, 1, 2, ...). In addition, the above predetermined time period may be a value other than 100 ms, for example, 200 ms, or 80 ms, and set to be various other values.

In addition, the forgetting coefficient and the averaging period for averaging, the threshold value, and the like may be set as parameters.

In addition, because the buffered data amount is a value reported discontinuously from the mobile station, between the report timing and an actual timing, when transmission is carried out by the mobile station the value is different from an actual value. Therefore, the mobile station number calculation section 2084 may calculate the buffered data amount in accordance with the value reported from the mobile station and PUSCH data amount from the mobile station received between the reporting timing and the actual timing.

In addition, the number of mobile stations subjected to the user selection in the scheduling process in the MAC processing section 2082 may be calculated as the number of mobile stations having data to be transmitted through PUSCH in the uplink transmission buffer, which is the number of the second mobile stations.

Here, a mobile station that satisfies all the following requirements is the mobile station subjected to the user selection in the scheduling processing (Requirement 1) "there are data to be transmitted through the PUSCH (the existence of data to be transmitted in the buffer of the mobile station is reported through the Scheduling Request or Buffer Status Report)"

(Requirement 2) "a time frame when the downlink control channel (UL Scheduling Grant) is transmitted or a time frame when the uplink shared channel is received or a time frame when acknowledgement information with respect to the shared channel is received is not overlapped with the time period when measurements for cells of different frequencies are carried out in the mobile station"

(Requirement 3) not in a DRX condition (Requirement 4) uplink synchronization is established (Requirement 5) handover between base stations is not directed Moreover, the mobile station number calculation section 2084 may calculate the number of the second mobile stations with respect to each logical channel, as described later. In this case, the calculation of the number of the mobile stations is carried out with respect to the logical channels. Namely, the mobile station number calculation section 2084 calculates the number of the logical channels. Alternatively, the mobile station number calculation section 2084 may calculate the number of the second mobile stations with respect to each priority class. In this case, the calculation of the number of the mobile stations is carried out with respect to the logical channels belonging to corresponding priority classes. Namely, the mobile station number calculation section 2084 calculates the number of the logical channels belonging to corresponding priority classes.

Because the mobile station having data to be transmitted in the uplink or the downlink transmission buffer is thought to be carrying out communications by consuming radio resources, the number of mobile stations associated with the consumption of the radio resources can be measured by measuring the number.

For example, the mobile station number calculation section 2084 may calculate the number of the mobile stations that are LTE active and not in the DRX state as the number of the mobile stations that highly frequently carry out communications through PDSCH or PUSCH, which is a shared channel, the number being the number of the third mobile stations, in accordance with information on whether the mobile station 100n is in the DRX state.

Because the mobile station not in the DRX state is thought to be carrying out communications by consuming the radio resources, the number of mobile stations associated with the consumption amount of the radio resources can be measured by measuring the number.

For example, the mobile station number calculation section 2084 may calculate the number of mobile stations that are LTE active and in the DRX state as the number of mobile stations that less frequently carry out communications through PDSCH or PUSCH, which is a shared channel, the number being the number of the fourth mobile stations, in accordance with information on whether the mobile station 100n is in the DRX state.

Although it is thought that an amount of the radio resources that the mobile station in the DRX state consumes is small, it becomes possible to accurately estimate the consumption amount of the radio resources by calculating the number.

For example, the mobile station number calculation section 2084 sets the number of the mobile stations that are LTE active as the number of the fifth mobile stations. The number of the mobile stations that are LTE active is the number of the mobile stations that establish connections with the base station apparatus 200, and the base station can easily recognize the number.

For example, the mobile station number calculation section 2084 may calculate the number of mobile stations that do not satisfy a predetermined transmission rate among the mobile stations that are LTE active, the number being the number of the sixth mobile stations, in accordance with the transmission rate in the MAC layer, or the RLC layer, or the PDCP layer regarding the uplink or downlink of the mobile station 100n. For example, the number of mobile stations whose transmission rate in the RLC layer regarding the uplink or downlink is 64 kbps or less may be the number of the mobile stations that do not satisfy the predetermined transmission rate among the mobile stations that are LTE active, the number being the number of the sixth mobile stations.

Figure 7:
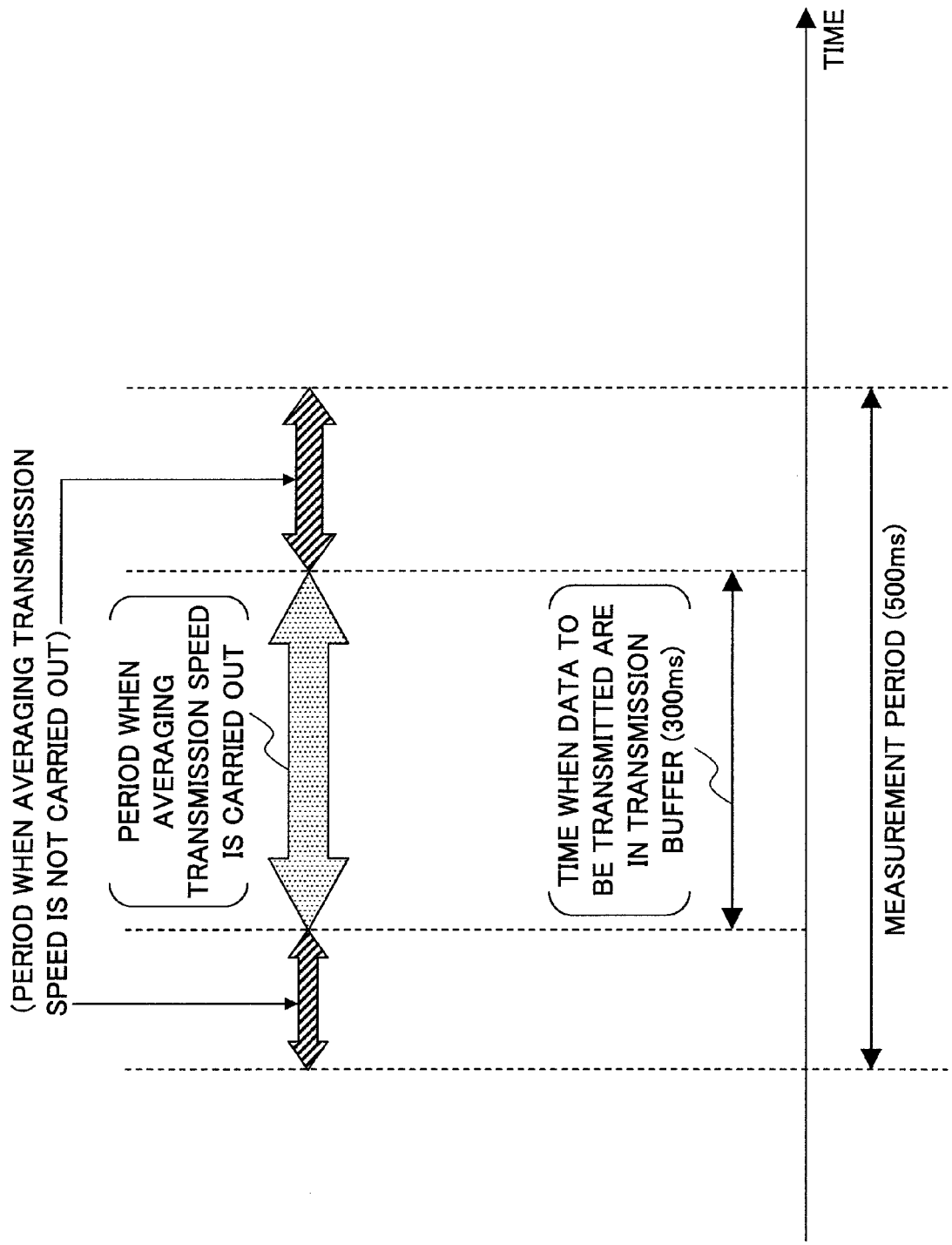
FIG. 7 is an explanatory view illustrating an averaging period for averaging transmission rate, according to an example of the present invention.

Here, the transmission rate in the MAC layer or the RLC layer or the PDCP layer regarding the uplink or downlink of the mobile station 100n may be calculated by setting the averaging period as a time period when data to be transmitted are present in the uplink or downlink transmission buffer. For example, when there are data only in a period of 300 ms in the measurement period of 500 ms, the transmission rate is calculated by averaging over the period of 300 ms, and averaging the transmission rate is not carried out in the remaining periods, as shown in FIG. 7.

Alternatively, the transmission rate in the MAC layer or the RLC layer or the PDCP layer regarding the uplink or downlink of the mobile station 100n may be calculated over all the measurement period regardless of the presence/absence of the data to be transmitted in the uplink or downlink transmission buffer.

In addition, the mobile station number calculation section 2084 provides the call processing section 210 with the transmission rate in the MAC layer or the RLC layer or the PDCP layer regarding the uplink or downlink of the mobile station 100*n*.

Moreover, the mobile station number calculation section 2084 may calculate the number of the sixth mobile stations with respect to each logical channel, as described later. In this case, the calculation of the number of the mobile stations is carried out with respect to the logical channels. In addition, the transmission rate is a transmission rate of the logical channel concerned. Namely, the mobile station number calculation section 2084 calculates the number of the logical channels that do not satisfy a predetermined transmission rate.

Alternatively, the mobile station number calculation section 2084 may calculate the number of the sixth mobile stations with respect to each priority class. In this case, the calculation of the number of the mobile stations is carried out with respect to the logical channels belonging to corresponding priority classes. In addition, the transmission rate is the average value or the total value of the transmission rates of the logical channels belonging to the priority class concerned. Namely, the mobile station number calculation section 2084 calculates the number of the logical channels that belong to each priority class and do not satisfy the predetermined transmission rate.

For example, the mobile station number calculation section 2084 may calculate the number of the mobile stations whose average data delay exceeds an allowable delay, the number being the number of the seventh mobile stations, in accordance with a buffered time of the packet data of the downlink and the uplink regarding the mobile station 100*n*. For example, a threshold value of the buffered time of the packet data may be defined as 200 ms, and when the number of mobile stations whose buffered time of the packet data of the uplink and the downlink regarding the mobile station 100*n* is more than or equal to 200 ms may be defined as the number of mobile stations whose average data delay exceeds the allowable delay, which is the number of the seventh mobile stations.

For example, an example of a calculation method of the average data delay is shown in the following. First, the buffered time of one packet is defined as "a time from when an RLC layer packet is stored in the RLC layer buffer until the packet is eliminated". Here, the event of elimination of the packet from the buffer may include all the cases such as discarding the packet after the acknowledgement is received, and discarding the packet based on a timer. The average data delay of the one packet may be calculated by averaging the buffered time of all the packets in the buffer over the averaging period. The packet is, for example, RLC SDU. In addition, while the above process is carried out with respect to the packet in the RLC layer, the process may be carried out with respect to the packet in the PDCP layer.

In addition, the mobile station number calculation section 2084 may calculate the number of the seventh mobile stations with respect to each logical channel, as described later. In this case, the calculation of the number of the mobile stations is carried out with respect to the logical channel. Namely, the mobile station number calculation section 2084 calculates the number of the logical channels whose average delay exceeds the allowable delay.

Alternatively, the mobile station number calculation section 2084 may calculate the number of the seventh mobile stations with respect to each priority class, as described later. In this case, the calculation of the number of the mobile stations is carried out with respect to the logical channels belonging to corresponding priority classes. Namely, the mobile station number calculation section 2084 calculates the number of the logical channels that belong to corresponding priority classes and whose average delay exceeds the allowable delay.

For example, the mobile station number calculation section 2084 may calculate the number of mobile stations in which data discarding due to delay takes place, the number being the number of the eighth mobile stations, in accordance with information on a destination mobile station in which the data discarding in the transmission buffer of the RLC layer due to delay takes place. For example, the number of the mobile stations that have undergone the data discarding in the transmission buffer of the RLC layer may be measured in a predetermined monitor period, and the number of the mobile stations may be set as the number of the eighth mobile stations.

Alternatively, the mobile station number calculation section 2084 measures the number of mobile stations that have undergone the data discarding number of times more than or equal to a predetermined threshold value in the transmission buffer of the RLC layer in a predetermined monitor period, and the number of the mobile stations may be set as the number of the eighth mobile stations.

Alternatively, the mobile station number calculation section 2084 may measure the number of mobile stations whose data amount of the packet data discarded in the transmission buffer of the RLC layer is more than or equal to a predetermined threshold value in a predetermined monitor period, and the number of the mobile stations may be set as the number of the eighth mobile stations.

Alternatively, the mobile station number calculation section 2084 may measure the number of mobile stations whose ratio of a data amount of the packet data discarded in the transmission buffer of the RLC layer with respect to a total data amount is more than or equal to a predetermined threshold value in a predetermined monitor period, and the number of the mobile stations may be set as the number of the eighth mobile stations.

When the information on the destination mobile station of the data discarded in the transmission buffer of the PDCP layer is received from the RLC processing section 2083 rather than the information on the destination mobile station of the data discarded in the transmission buffer of the RLC layer, the mobile station number calculation section 2084 may calculate the number of mobile stations in which the data discarding due to delay takes place, which is the number of the eighth mobile stations, in accordance with the information on the destination mobile station of the data discarded in the transmission buffer of the PDCP layer. For example, the number of the mobile stations in which the packet data have been discarded in the transmission buffer of the PDCP layer may be measured in a predetermined monitor period, and the number of the mobile stations may be set as the number of the eighth mobile stations.

Alternatively, the mobile station number calculation section 2084 may calculate the number of mobile stations in which the data discarding due to delay takes place, the number being the number of the eighth mobile stations, in accordance with the information on the destination mobile station in which the data discarding in the transmission buffer of the PDCP layer or the RLC layer due to delay takes place. For example, the number of mobile stations in which the packet data discarding in the transmission buffer of the RLC layer or the PDCP layer due to delay takes place may be measured in a predetermined monitor period, and the number of the mobile stations may be set as the number of the eighth mobile stations.

In addition, the mobile station number calculation section 2084 may calculate the number of the eighth mobile stations with respect to each logical channel, as described later. In this case, the calculation of the number of the mobile stations is carried out with respect to the logical channel. Namely, the mobile station number calculation section 2084 calculates the number of the logical channels in which the data discarding due to delay takes place.

Alternatively, the mobile station number calculation section 2084 may calculate the number of the eighth mobile stations with respect to each priority class, as described later. In this case, the calculation of the mobile stations is carried out with respect to the logical channels belonging to corresponding priority classes. Namely, the mobile station number calculation section 2084 calculates the number of the logical channels in which the data discarding due to delay takes place.

The above example shows a case where the number of mobile stations in which the data discarding due to delay in downlink takes place, the number being the number of the eighth mobile stations, is calculated. However, the number of mobile stations in which the data discarding due to delay takes place, the number being the number of the eighth mobile stations, may be calculated with respect to the uplink in a similar manner.

For example, the mobile station number calculation section 2084 may receives the information on the discontinuity of the sequence number of the uplink PDCP layer from the RLC processing section 2083, and calculate the number of the mobile stations in which the data discarding due to delay in uplink takes place in accordance with the discontinuity of the sequence number of the uplink PDCP layer. Namely, the mobile station number calculation section 2084 estimates that the discontinuity of the sequence number takes place due to data discarding due to delay in the mobile station, and calculates the number of the mobile stations in which the data discarding due to delay takes place in accordance with the discontinuity of the sequence number.

More specifically, the mobile station number calculation section 2084 may measure the number of mobile stations in which the discontinuity of the sequence number of the uplink PDCP layer is more than or equal to a predetermined threshold value in a predetermined monitor period, and the number of the mobile stations may be set as the number of the eighth mobile stations.

Alternatively, the mobile station number calculation section 2084 may measure the number of mobile stations whose data amount of the discarded data that is estimated from the discontinuity of the sequence number of the uplink PDCP layer is more than or equal to a predetermined threshold value in a predetermined monitor period, and the number of the mobile stations may be set as the number of the eighth mobile stations.

Alternatively, the mobile station number calculation section 2084 may measure the number of mobile stations whose ratio of the data amount of the discarded data that is estimated from the discontinuity of the sequence number of the uplink PDCP layer in a predetermined monitor period, and the number of the mobile stations may be set as the number of the eighth mobile stations.

In addition, the mobile station number calculation section 2084 may calculate the number of the eighth mobile stations in uplink with respect to each logical channel. In this case, the calculation of the number of the mobile stations described above is carried out with respect to the logical channel. Namely, the mobile station number calculation section 2084 calculates the number of the logical channels in which the data discarding due to delay takes place.

In addition, the mobile station number calculation section 2084 may provide the call processing section 210 with the transmission buffer state of the RLC layer provided from the RLC processing section, namely, the buffered amount or the buffered time of the downlink packet data of the mobile station 100*n*.

The number of the first mobile stations through the number of the eighth mobile stations may be calculated with respect to each TTI (or referred to as a "sub-frame"), or may be a value sampled at predetermined time intervals. In addition, the number of the first mobile stations through the number of the eighth mobile stations may be a value obtained by averaging the values with respect to each TTI in a predetermined averaging period, or a value obtained by averaging the values sampled at the predetermined time intervals over a predetermined averaging period. In addition, the averaging period or the sampling period may be configured as parameters.

More specifically, the averaged value or the total value over a predetermined time period, for example, 100 ms is calculated, and a value after filtering the above averaged value or the total value using the following expression may be measured as the number of the first mobile stations through the number of the eighth mobile stations.

$$F_n = (1-a)*F_{n-1} + a*M_n \qquad \text{Expression:}$$

$F_n$: an updated value after filtering
$F_{n-1}$: an old value after filtering
a: filtering coefficient
$M_n$: the averaged value or the total value over a predetermined time period, for example, 100 ms A value of "a" may be set to, for example, $\frac{1}{2}^{(k/2)}$ (k=0, 1, 2, ...). In addition, the above predetermined time period may be a value other than 100 ms, for example, 200 ms, or 80 ms, and set to be various other values.

Figure 5:
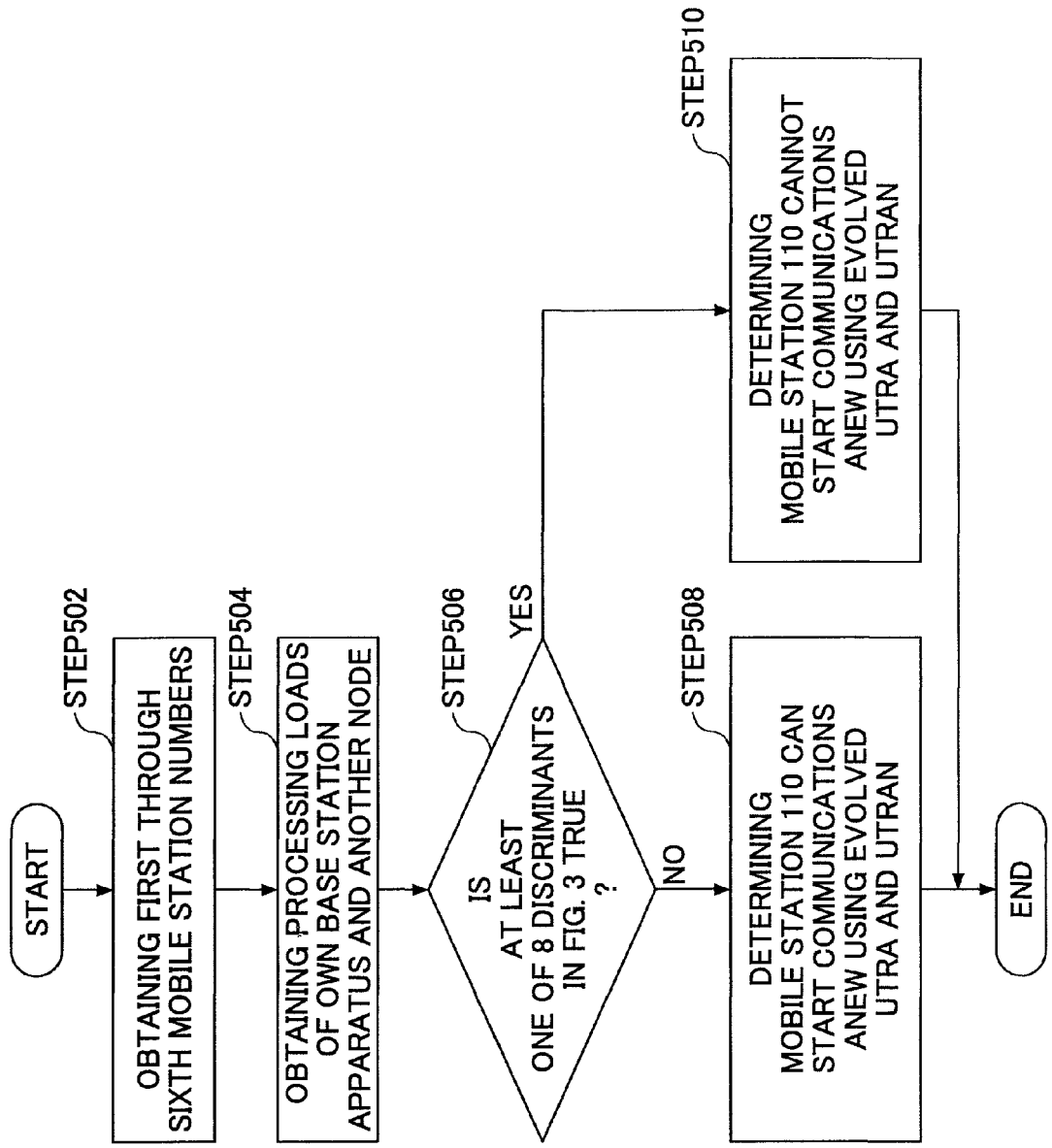
FIG. 5 is a flowchart illustrating a communications control method according to an example of the present invention.

Next, a transmission control method in the base station apparatus 200, according to this example, is explained with reference to FIG. 5.

The mobile station number calculation section 2084 in the baseband signal processing section 208 obtains the number of the first mobile stations through the number of the eighth mobile stations (step S502).

The call processing 210 obtains or confirms the processing load of the own base station apparatus and the process load of another node (step S504). The call processing section 210 determines whether at least one of the ten discriminants shown in FIG. 3B is true (step S506).

When all the ten discriminants shown in FIG. 3B are false (step S506: NO), the call processing section 210 determines that the mobile station 110 starts communications anew with the base station apparatus 200 in the cell 50 using Evolved UTRA and UTRAN (step S508). At this time, the call processing section 210 carries out a process that allows the mobile station 110 to start the communications anew with the base station apparatus 200 in the cell 50 using Evolved UTRA and UTRAN.

On the other hand, when at least one of the ten discriminants shown in FIG. 3B is true (step S506: YES), the call processing section 210 determines that the mobile station 110 cannot start the communications anew with the base station 200 in the cell 50 using Evolved UTRA and UTRAN. In this case, the call processing section 210 does not carry out the process that allows the mobile station 110 to start the communications with the base station 200 in the cell 50 using Evolved UTRA and UTRAN.

In the above example, all the ten discriminants shown in FIG. 3B are used to carryout the determination. However, parts of the ten discriminants may be used to carry out the determination.

Figure 6:
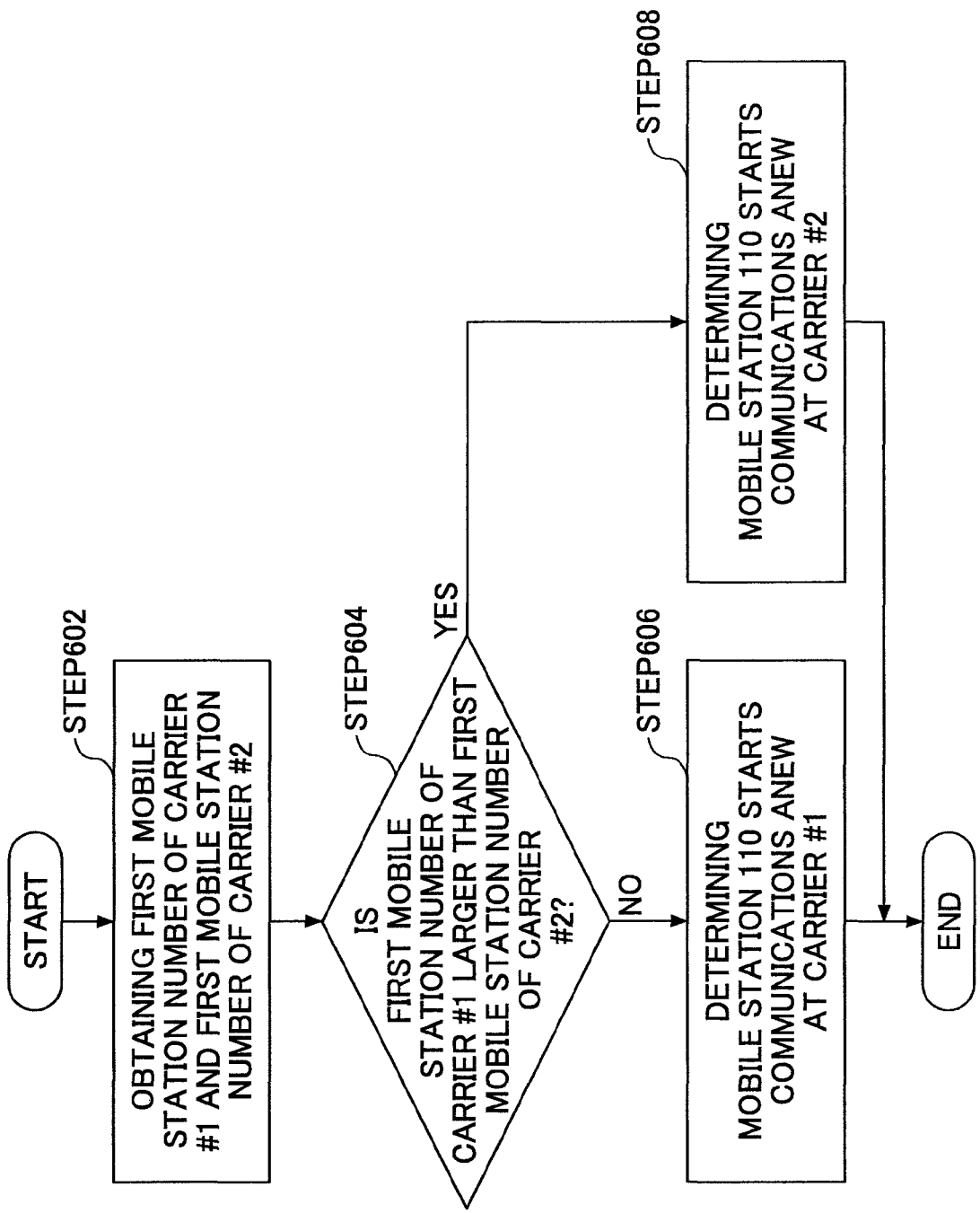
FIG. 6 is a flowchart illustrating a communications control method according to an example of the present invention.

Next, a transmission control method in the base station apparatus 200, according to this example, is explained with reference to FIG. 6.

The mobile station number calculation section 2084 obtains the number of the first mobile stations of carrier #1 and the number of the first mobile stations of carrier #2 (step S602). The call processing section 210 determines whether the number of the first mobile stations of carrier #1 is larger than the number of the first mobile stations of carrier #2 (step S604).

When the number of the first mobile stations of carrier #1 is not larger than the number of the first mobile stations of carrier #2 (step S604: NO), the call processing section 210 determines that the mobile station 110 starts communications anew using Evolved UTRA and UTRAN (step S606) through the carrier #1. Namely, the call processing section 210 sets the carrier #1 to be the carrier with which the communications are carried out when establishing the communications between the mobile station 110 and the base station apparatus 200.

On the other hand, when the number of the first mobile stations of carrier #1 is larger than the number of the first mobile stations of carrier #2 (step S604: YES), the call processing section 210 determines that the mobile station 110 starts communications using Evolved UTRA and UTRAN through the carrier #2 (step S608). Namely, the call processing section 210 sets the carrier #2 to be the carrier with which the communications are carried out when establishing the communications between the mobile station 110 and the base station apparatus 200.

In the above example, the number of the first mobile stations of carrier #1 and the number of the first mobile stations of carrier #2 are compared. However, a similar determination may be made by using the number of the second mobile stations, the number of the third mobile stations, the number of the fourth mobile stations, the number of the fifth mobile stations, the number of the sixth mobile stations, the number of the seventh mobile stations, the number of the eighth mobile stations, or the processing load of the own base station apparatuses with respect to each carrier. Alternatively, the similar determination may be made by using plural ones of the number of the first mobile stations through the number of the eighth mobile stations and the processing load of the own base station apparatus with respect to each carrier. By controlling in such a manner, the number of the mobile stations may be equal between the carriers #1 and #2.

The above example shows a case where the mobile station 110 starts communications anew with the base station apparatus 200 using Evolved UTRA and UTRAN in the cell 50. This may include a case where communications are started with a base station 200 in a cell 50 by cell changes and the like.

Alternatively, the above example shows a case where the mobile station 110 starts communications anew with the base station apparatus 200 in the cell 50 using Evolved UTRA and UTRAN. In addition to or instead of this, a carrier on which the mobile station 110 camps (remains in the area of) after the communications are completed may be specified in accordance with at least one of the number of the first mobile stations, the number of the second mobile stations, the number of the third mobile stations, the number of the fourth mobile stations, the number of the fifth mobile stations, the number of the sixth mobile stations, the number of the seventh mobile stations, and the number of the eighth mobile stations when the mobile station 110 completes the communications with the base station apparatus 200 in the cell 50 using Evolved UTRA and UTRAN. This is explained in the following with reference to FIG. 10.

The call processing section 210 determines that the mobile station 110 carrying out communications with the base station apparatus 200 in the cell 50 using Evolved UTRA and UTRAN completes the communications (step S1002). Here, the completion of the communications may be found when the mobile station 110 triggers or when the other end of the communications with the mobile station 110 triggers. At any rate, when the communications are completed, a predetermined message is exchanged and thus the call processing section 210 can determine the completion of the communications.

The mobile station number calculation section 2084 in the baseband signal processing section 208 obtains the number of the first mobile stations of the carrier #1 and the number of the first mobile stations of the carrier #2 (step S1004). The call processing section 210 determines whether the number of the first mobile stations of the carrier #1 is larger than the number of the first mobile stations of the carrier #2 (step S1006).

When the number of the first mobile stations of the carrier #1 is not larger than the number of the first mobile stations of the carrier #2 (step S1006: NO), the call processing section 210 determines that the mobile station 110 camps on (remains in the area of) the carrier #1 in an idle state after the completion of the communications (step S1008). Namely, the call processing section 210 directs the mobile station 110 to camp on the carrier #1.

On the other hand, when the number of the first mobile stations of the carrier #1 is larger than the number of the first mobile stations of the carrier #2 (step S1006: YES), the call processing 210 determines that the mobile station 110 camps on (remains in the area of) the carrier #2 in an idle state after the completion of the communications (step S1010). Namely, the call processing section 210 directs the mobile station 110 to camp on the carrier #2.

In the above example, the number of the first mobile stations of the carrier #1 and the number of the first mobile stations of the carrier #2 are compared. However, the similar determination may be made by using the number of the second mobile stations, the number of the third mobile stations, the number of the fourth mobile stations, the number of the fifth mobile stations, the number of the sixth mobile stations, the number of the seventh mobile stations, the number of the eighth mobile stations, or the processing load of the own base station apparatuses with respect to each carrier. Alternatively, the similar determination may be made by using plural ones of the number of the first mobile stations through the number of the eighth mobile stations and the processing load of the own base station apparatus with respect to each carrier. By controlling in such a manner, the number of the mobile stations may be equal between the carriers #1 and #2.

In the above steps S1008 and S1010, the base station apparatus 200 specifies the carrier on which the mobile station 110 should camp by providing the mobile station 110 with a cell ID and frequency on which the mobile station 110 is to camp when the communications with the mobile station 110 are completed. The cell ID and frequency may be included, for example, in the completion message indicating the completion of the communications.

Although the number of the mobile stations is used in the above example, a fraction or ratio with respect to a predetermined value may be used instead to carry out a similar control. For example, when the maximum number of the mobile stations connectable in the cell is defined, the number of the first mobile stations through the number of the eighth mobile stations may be defined with a ratio (percent) with respect to the maximum number. Alternatively, the number of the first mobile stations through the number of the eighth mobile stations may be defined with a ratio (percent) with respect to the number of the mobile stations connected in the cell at the time. The number of the mobile stations connected in the cell is the number of the mobile stations in an RRC connected state in the cell.

The above calculation of the number of the mobile stations may be carried out with respect to each service type, or each contract type, or each terminal device type, each Radio Bearer type, each logical channel, or each priority class type.

In the above calculation of the number of the mobile stations, a spontaneous value such as 1 TTI (or, referred to as a sub-frame), a value obtained by measuring and averaging over a longer period, or a value obtained by sampling the spontaneous value at predetermined sampling periods and averaging the sampled values. When carrying out averaging, the averaging may be a normal averaging, or an averaging using a forgetting coefficient. In addition, the averaging period, the forgetting coefficient, and the like for averaging may be set as parameters.

According to an example of the present invention, the number of the mobile stations associated with a consumption amount of the radio resources may be calculated, and call admission control using the number of the mobile stations is performed to carry out the carrier selection, thereby providing more efficient communications.

In addition, an example of a system to which Evolved UTRA and UTRAN (another name: Long Term Evolution or Super 3G) is applied is described in the above examples. However, the base station apparatus and the communications control method according to an embodiment of the present invention are applicable to all the systems carrying out communications using a shared channel.

In addition, the number of the logical channels is calculated in the above example. However, plural logical channels are grouped (referred to as a logical channel group, later) and the number of the logical channel groups may be calculated.

While the present invention has been explained with reference to specific examples, the examples are merely illustrative and a person having ordinary skill in the art will understand various alterations, modifications, substitutions, replacements and the like. While the present invention has been explained by using specific values in order to facilitate the understanding of the present invention, those values are merely examples and various values may be used unless otherwise noted. While the apparatuses according to the examples of the present invention are explained in the form of the operational block diagrams for simplicity of explanation, such apparatuses may be realized by hardware, software or a combination thereof. The present invention is not limited to the above examples, but includes various alterations, modifications, substitutions, replacements and the like without departing the scope of the present invention.

This international application claims the benefit of the priority date of Japanese Patent Application No. 2007-010858 filed on Jan. 19, 2007, the entire contents of which application are incorporated herein by reference.

This international application claims the benefit of the priority date of Japanese Patent Application No. 2007-150934 filed on Jun. 6, 2007, the entire content of which application are incorporated herein by reference.

This international application claims the benefit of the priority date of Japanese Patent Application No. 2007-313963 filed on Dec. 4, 2007, the entire content of which application are incorporated herein by reference.

This international application claims the benefit of the priority date of Japanese Patent Application No. 2007-329026 filed on Dec. 20, 2007, the entire content of which application are incorporated herein by reference.

The invention claimed is:

1. A base station apparatus that carries out communications with plural mobile stations using a physical downlink shared channel (PDSCH), the base station apparatus comprising:
   a calculation section that calculates the number of the mobile stations having data to be transmitted by the PDSCH in a downlink transmission buffer among the plural mobile stations with respect to each priority class,
   wherein the downlink transmission buffer is a buffer of a medium access control (MAC) layer, a radio link control (RLC) layer or a packet data convergence protocol (PDCP) layer used in a standard of Evolved-Universal Terrestrial Radio Access (Evolved-UTRA) and Universal Terrestrial Radio Access Network (UTRAN) that defines the PDSCH.

2. A base station apparatus that carries out communications with plural mobile stations using a shared channel that is a physical downlink shared channel (PDSCH) or a physical uplink shared channel (PUSCH), the base station apparatus comprising:
   a calculation section that calculates at least one of the number of the mobile stations that highly frequently carries out the communications through the shared channel and the number of the mobile stations that less frequently carries out the communications through the shared channel among the plural mobile stations, with respect to each priority class,
   wherein the base station apparatus carries out communications with the plural mobile stations base on a standard of Evolved-Universal Terrestrial Radio Access (Evolved UTRA) and Universal Terrestrial Radio Access Network (UTRAN) that defines the PDSCH and the PUSCH.

3. A base station apparatus that carries out communications with plural mobile stations using a shared channel that is a physical downlink shared channel (PDSCH) or a physical uplink shared channel (PUSCH), the base station apparatus comprising:
   a calculation section that calculates at least one of the number of mobile stations having a transmission rate less than a predetermined threshold value among the plural mobile stations and the number of logical channels of said mobile stations among the logical channels of the plural mobile stations, with respect to each priority class,
   wherein the base station apparatus carries out communications with the plural mobile stations base on a standard of Evolved-Universal Terrestrial Radio Access (Evolved UTRA) and Universal Terrestrial Radio Access Network (UTRAN) that defines the PDSCH and the PUSCH.

4. A base station apparatus that carries out communications with plural mobile stations using a shared channel, the base station apparatus comprising:
   a first calculation section that calculates the number of first mobile stations, the number of first mobile stations being at least one of the number of the mobile stations having data to be transmitted through the shared channel in a downlink transmission buffer among the plural mobile stations and the number of logical channels of said mobile stations among the logical channels of the mobile stations;

a second calculation section that calculates the number of second mobile stations, the number of second mobile stations being at least one of the number of the mobile stations having data to be transmitted through the shared channel in an uplink transmission buffer among the plural mobile stations and the number of the logical channels of said logical channels among the logical channels of the mobile stations;

a third calculation section that calculates the number of third mobile stations, the number of third mobile stations being the number of mobile stations that highly frequently carry out communications through the shared channel among the plural mobile stations;

a fourth calculation section that calculates the number of fourth mobile stations, the number of fourth mobile stations being the number of mobile stations that less frequently carry out communications through the shared channel among the plural mobile stations;

a fifth calculation section that calculates the number of fifth mobile stations, the number of fifth mobile stations being the number of the plural mobile stations;

a sixth calculation section that calculates the number of sixth mobile stations, the number of sixth mobile stations being at least one of the number of the mobile stations having a transmission rate less than a predetermined threshold value among the plural mobile stations and the number of the logical channels of said mobile stations among the logical channels of the mobile stations;

a seventh calculation section that calculates the number of seventh mobile stations, the number of seventh mobile stations being at least one of the number of the mobile stations having a data buffered time longer than a second predetermined threshold value among the plural mobile stations and the number of the logical channels of said mobile stations among the logical channels of the mobile stations;

an eighth calculation section that calculates the number of eighth mobile stations, the number of eighth mobile stations being at least one of the number of the mobile stations having data discarded due to delay among the plural mobile stations and the number of the logical channels of said mobile stations among the logical channels of the mobile stations;

a call admission control section that controls admission of communication from a new mobile station in accordance with at least one of the number of the first mobile stations, the number of the second mobile stations, the number of the third mobile stations, the number of the fourth mobile stations, the number of the sixth mobile stations, the number of the seventh mobile stations, and the number of the eighth mobile stations.

5. The base station apparatus of claim 4, wherein the call admission control section that controls admission of communication from the new mobile station in accordance with the number of the fifth mobile stations and at least one of the number of the first mobile stations, the number of the second mobile stations, the number of the third mobile stations, the number of the fourth mobile stations, the number of the sixth mobile stations, the number of the seventh mobile stations, and the number of the eighth mobile stations.

6. A base station apparatus that carries out communications with plural mobile stations using a shared channel, the base station apparatus comprising:

a first calculation section that calculates the number of first mobile stations, the number of first mobile stations being at least one of the number of the mobile stations having data to be transmitted through the shared channel in a downlink transmission buffer among the plural mobile stations and the number of logical channels of said mobile stations among the logical channels of the mobile stations;

a second calculation section that calculates the number of second mobile stations, the number of second mobile stations being at least one of the number of the mobile stations having data to be transmitted through the shared channel in an uplink transmission buffer among the plural mobile stations and the number of the logical channels of said logical channels among the logical channels of the mobile stations;

a third calculation section that calculates the number of third mobile stations, the number of third mobile stations being the number of mobile stations that highly frequently carry out communications through the shared channel among the plural mobile stations;

a fourth calculation section that calculates the number of fourth mobile stations, the number of fourth mobile stations being the number of mobile stations that less frequently carry out communications through the shared channel among the plural mobile stations;

a fifth calculation section that calculates the number of fifth mobile stations, the number of fifth mobile stations being the number of the plural mobile stations;

a sixth calculation section that calculates the number of sixth mobile stations, the number of sixth mobile stations being at least one of the number of the mobile stations having a transmission rate less than a predetermined threshold value among the plural mobile stations and the number of the logical channels of said mobile stations among the logical channels of the mobile stations;

a seventh calculation section that calculates the number of seventh mobile stations, the number of seventh mobile stations being at least one of the number of the mobile stations having a data buffered time longer than a second predetermined threshold value among the plural mobile stations and the number of the logical channels of said mobile stations among the logical channels of the mobile stations;

an eighth calculation section that calculates the number of eighth mobile stations, the number of eighth mobile stations being at least one of the number of the mobile stations having data discarded due to delay and the number of the logical channels of said mobile stations among the logical channels of the mobile stations among the plural mobile stations;

a processing load measurement section that measures a processing load with respect to each of frequency bands; and a frequency selection section that selects a frequency band with which a mobile station carries out communications anew, in accordance with at least one of the number of the first mobile stations, the number of the second mobile stations, the number of the third mobile stations, the number of the fourth mobile stations, the number of the sixth mobile stations, the number of the seventh mobile stations, and the number of the eighth mobile stations, and the processing load with respect to each frequency band.

7. The base station apparatus of claim 6, wherein the frequency selection section that selects a frequency band with which a mobile station that carries out communications anew in accordance with the number of the fifth mobile stations and at least one of the number of the first mobile stations, the number of the second mobile stations, the number of the third mobile stations, the number of the fourth mobile stations, the number of the sixth mobile stations, the number of the seventh mobile stations, and the number of the eighth mobile stations.

8. A base station apparatus that carries out communications with plural mobile stations using a shared channel, the base station apparatus comprising:
a first calculation section that calculates the number of first mobile stations, the number of first mobile stations being at least one of the number of the mobile stations having data to be transmitted through the shared channel in a downlink transmission buffer among the plural mobile stations and the number of logical channels of said mobile stations among the logical channels of the mobile stations;
a second calculation section that calculates the number of second mobile stations, the number of second mobile stations being at least one of the number of the mobile stations having data to be transmitted through the shared channel in an uplink transmission buffer among the plural mobile stations and the number of the logical channels of said logical channels among the logical channels of the mobile stations;
a third calculation section that calculates the number of third mobile stations, the number of third mobile stations being the number of mobile stations that highly frequently carry out communications through the shared channel among the plural mobile stations;
a fourth calculation section that calculates the number of fourth mobile stations, the number of fourth mobile stations being the number of mobile stations that less frequently carry out communications through the shared channel among the plural mobile stations;
a fifth calculation section that calculates the number of fifth mobile stations, the number of fifth mobile stations being the number of the plural mobile stations;
a sixth calculation section that calculates the number of sixth mobile stations, the number of sixth mobile stations being at least one of the number of the mobile stations having a transmission rate less than a predetermined threshold value among the plural mobile stations and the number of the logical channels of said mobile stations among the logical channels of the mobile stations;
a seventh calculation section that calculates the number of seventh mobile stations, the number of seventh mobile stations being at least one of the number of the mobile stations having a data buffered time longer than a second predetermined threshold value among the plural mobile stations and the number of the logical channels of said mobile stations among the logical channels of the mobile stations;
an eighth calculation section that calculates the number of eighth mobile stations, the number of eighth mobile stations being at least one of the number of the mobile stations having data discarded due to delay among the plural mobile stations and the number of the logical channels of said mobile stations among the logical channels of the mobile stations;
a processing load measurement section that measures a processing load with respect to each of frequency bands; and
a frequency selection section that selects a frequency band that a mobile station remains in an area of after completion of communications, in accordance with at least one of the number of the first mobile stations, the number of the second mobile stations, the number of the third mobile stations, the number of the fourth mobile stations, the number of the sixth mobile stations, the number of the seventh mobile stations, the number of the eighth mobile stations, and the processing load with respect to each frequency band.

9. The base station apparatus of claim 8, wherein the frequency selection section that selects a frequency band that a mobile station remains in an area of after completion of communications, in accordance with the number of the fifth mobile stations and at least one of the number of the first mobile stations, the number of the second mobile stations, the number of the third mobile stations, the number of the fourth mobile stations, the number of the sixth mobile stations, the number of the seventh mobile stations, the number of the eighth mobile stations, and the processing load with respect to each frequency band.

10. The base station apparatus of claim 4, wherein the downlink transmission buffer is one of a Medium Access Control (MAC) layer buffer, a radio link control (RLC) layer buffer, and a packet data convergence protocol (PDCP) layer buffer in the base station apparatus.

11. The base station apparatus of claim 5, wherein the downlink transmission buffer is one of a Medium Access Control (MAC) layer buffer, a radio link control (RLC) layer buffer, and a packet data convergence protocol (PDCP) layer buffer in the base station apparatus.

12. The base station apparatus of claim 6, wherein the downlink transmission buffer is one of a Medium Access Control (MAC) layer buffer, a radio link control (RLC) layer buffer, and a packet data convergence protocol (PDCP) layer buffer in the base station apparatus.

13. The base station apparatus of claim 7, wherein the downlink transmission buffer is one of a Medium Access Control (MAC) layer buffer, a radio link control (RLC) layer buffer, and a packet data convergence protocol (PDCP) layer buffer in the base station apparatus.

14. The base station apparatus of claim 8, wherein the downlink transmission buffer is one of a Medium Access Control (MAC) layer buffer, a radio link control (RLC) layer buffer, and a packet data convergence protocol (PDCP) layer buffer in the base station apparatus.

15. The base station apparatus of claim 9, wherein the downlink transmission buffer is one of a Medium Access Control (MAC) layer buffer, a radio link control (RLC) layer buffer, and a packet data convergence protocol (PDCP) layer buffer in the base station apparatus.

16. The base station apparatus of claim 4, wherein the calculation section calculates one of the number of the mobile stations having data to be transmitted through the shared channel and the number of the logical channels of said mobile stations, in accordance with a buffer state reported from the plural mobile stations.

17. The base station apparatus of claim 5, wherein the calculation section calculates one of the number of the mobile stations having data to be transmitted through the shared channel and the number of the logical channels of said mobile stations, in accordance with a buffer state reported from the plural mobile stations.

18. The base station apparatus of claim 15, wherein the calculation section calculates one of the number of the mobile stations having data to be transmitted through the shared channel and the number of the logical channels of said mobile stations, in accordance with a buffer state reported from the plural mobile stations.

19. The base station apparatus of claim 7, wherein the calculation section calculates one of the number of the mobile stations having data to be transmitted through the shared channel and the number of the logical channels of said mobile stations, in accordance with a buffer state reported from the plural mobile stations.

20. The base station apparatus of claim 8, wherein the calculation section calculates one of the number of the mobile stations having data to be transmitted through the shared channel and the number of the logical channels of said mobile stations, in accordance with a buffer state reported from the plural mobile stations.

21. The base station apparatus of claim 9, wherein the calculation section calculates one of the number of the mobile stations having data to be transmitted through the shared channel and the number of the logical channels of said mobile stations, in accordance with a buffer state reported from the plural mobile stations.

22. The base station apparatus of claim 2, wherein the mobile stations that highly frequently carry out communications through the shared channel are in a state where connection with the base station apparatus is established and carry out non-discontinuous receiving (Non-DRX) communications, and that the mobile stations that less frequently carry out communications through the shared channel are in a state where connection with the base station apparatus is established and carry out DRX communications.

23. The base station apparatus of claim 4, wherein the mobile stations that highly frequently carry out communications through the shared channel are in a state where connection with the base station apparatus is established and carry out non-discontinuous receiving (Non-DRX) communications, and that the mobile stations that less frequently carry out communications through the shared channel are in a state where connection with the base station apparatus is established and carry out DRX communications.

24. The base station apparatus of claim 5, wherein the mobile stations that highly frequently carry out communications through the shared channel are in a state where connection with the base station apparatus is established and carry out non-discontinuous receiving (Non-DRX) communications, and that the mobile stations that less frequently carry out communications through the shared channel are in a state where connection with the base station apparatus is established and carry out DRX communications.

25. The base station apparatus of claim 6, wherein the mobile stations that highly frequently carry out communications through the shared channel are in a state where connection with the base station apparatus is established and carry out non-discontinuous receiving (Non-DRX) communications, and that the mobile stations that less frequently carry out communications through the shared channel are in a state where connection with the base station apparatus is established and carry out DRX communications.

26. The base station apparatus of claim 7, wherein the mobile stations that highly frequently carry out communications through the shared channel are in a state where connection with the base station apparatus is established and carry out non-discontinuous receiving (Non-DRX) communications, and that the mobile stations that less frequently carry out communications through the shared channel are in a state where connection with the base station apparatus is established and carry out DRX communications.

27. The base station apparatus of claim 2, wherein the calculation section calculates at least one of the number of the mobile stations in which data discarding due to delay in uplink takes place and the number of the logical channels of said mobile stations, in accordance with discontinuity of a sequence number of a packet data convergence protocol (PDCP) layer.

28. The base station apparatus of claim 4, wherein the eighth calculation section calculates at least one of the number of the mobile stations in which data discarding due to delay in uplink takes place and the number of the logical channels of said mobile stations, in accordance with discontinuity of a sequence number of a packet data convergence protocol (PDCP) layer.

29. The base station apparatus of claim 5, wherein the eighth calculation section calculates at least one of the number of the mobile stations in which data discarding due to delay in uplink takes place and the number of the logical channels of said mobile stations, in accordance with discontinuity of a sequence number of a packet data convergence protocol (PDCP) layer.

30. The base station apparatus of claim 6, wherein the eighth calculation section calculates at least one of the number one of the mobile stations in which data discarding due to delay in uplink takes place and the number of the logical channels of said mobile stations, in accordance with discontinuity of a sequence number of a packet data convergence protocol (PDCP) layer.

31. The base station apparatus of claim 7, wherein the eighth calculation section calculates at least one of the number of the mobile stations in which data discarding due to delay in uplink takes place and the number of the logical channels of said mobile stations, in accordance with discontinuity of a sequence number of a packet data convergence protocol (PDCP) layer.

32. The base station apparatus of claim 8, wherein the eighth calculation section calculates at least one of the number of the mobile stations in which data discarding due to delay in uplink takes place and the number of the logical channels of said mobile stations, in accordance with discontinuity of a sequence number of a packet data convergence protocol (PDCP) layer.

33. The base station apparatus of claim 9, wherein the eighth calculation section calculates at least one of the number of the mobile stations in which data discarding due to delay in uplink takes place and the number of the logical channels of said mobile stations, in accordance with discontinuity of a sequence number of a packet data convergence protocol (PDCP) layer.

34. The base station apparatus of claim 3, wherein the transmission rate is a transmission rate in a time period during which data to be transmitted through the shared channel exist in a transmission buffer.

35. The base station apparatus of claim 4, wherein the transmission rate is a transmission rate in a time period during which data to be transmitted through the shared channel exist in the transmission buffer.

36. The base station apparatus of claim 5, wherein the transmission rate is a transmission rate in a time period during which data to be transmitted through the shared channel exist in the transmission buffer.

37. The base station apparatus of claim 6, wherein the transmission rate is a transmission rate in a time period during which data to be transmitted through the shared channel exist in the transmission buffer.

38. The base station apparatus of claim 7, wherein the transmission rate is a transmission rate in a time period during which data to be transmitted through the shared channel exist in the transmission buffer.

39. The base station apparatus of claim 8, wherein the transmission rate is a transmission rate in a time period during which data to be transmitted through the shared channel exist in the transmission buffer.

40. The base station apparatus of claim 9, wherein the transmission rate is a transmission rate in a time period during which data to be transmitted through the shared channel exist in the transmission buffer.

41. The base station apparatus claimed in claim 4, further comprising a processing load measurement section that measures processing load, wherein the call admission control section controls admission of a new mobile station in accordance with at least one of the number of the first mobile stations, the number of the second mobile stations, the number of the third mobile stations, the number of the fourth mobile stations, the number of the fifth mobile stations, the number of the sixth mobile stations, the number of the seventh mobile stations, and the number of the eighth mobile stations, and the processing load.

42. The base station apparatus of claim 6, wherein the processing load is at least one of a CPU usage ratio, a memory usage ratio, and a buffer usage ratio.

43. The base station apparatus of claim 9, wherein the processing load is at least one of a CPU usage ratio, a memory usage ratio, and a buffer usage ratio.

44. The base station apparatus of claim 41, wherein the processing load is at least one of a CPU usage ratio, a memory usage ratio, and a buffer usage ratio.

45. A communications control method in a base station apparatus that carries out communications with plural mobile stations using a shared channel, the method being characterized by:
 a first step, in which the number of first mobile stations is calculated, the number of first mobile stations being at least one of the number of the mobile stations having data to be transmitted through the shared channel in a downlink transmission buffer among the plural mobile stations and the number of logical channels of said mobile stations among the logical channels of the mobile stations;
 a second step, in which the number of second mobile stations is calculated, the number of second mobile stations being at least one of the number of the mobile stations having data to be transmitted through the shared channel in an uplink transmission buffer among the plural mobile stations and the number of the logical channels of said logical channels among the logical channels of the mobile stations;
 a third step, in which the number of third mobile stations is calculated, the number of third mobile stations being the number of mobile stations that highly frequently carry out communications through the shared channel among the plural mobile stations;
 a fourth step, in which the number of fourth mobile stations is calculated, the number of fourth mobile stations being the number of mobile stations that less frequently carry out communications through the shared channel;
 a fifth step, in which the number of fifth mobile stations is calculated, the number of fifth mobile stations being the number of the plural mobile stations;
 a sixth step, in which the number of sixth mobile stations is calculated, the number of sixth mobile stations being at least one of the number of the mobile stations having a transmission rate less than a predetermined threshold value among the plural mobile stations and the number of the logical channels of said mobile stations among the logical channels of the mobile stations;
 a seventh step, in which the number of seventh mobile stations is calculated, the number of seventh mobile stations being at least one of the number of the mobile stations having a data buffered time longer than a second predetermined threshold value among the plural mobile stations and the number of the logical channels of said mobile stations among the logical channels of the mobile stations;
 an eighth step, in which the number of eighth mobile stations is calculated, the number of eighth mobile stations being at least one of the number of the mobile stations having data discarded due to delay among the plural mobile stations and the number of the logical channels of said mobile stations among the number of the logical channels of the mobile stations; and
 a ninth step, in which admission of a new mobile station is controlled in accordance with at least one of the number of the first mobile stations, the number of the second mobile stations, the number of the third mobile stations, the number of the fourth mobile stations, the number of the sixth mobile stations, the number of the seventh mobile stations, and the number of the eighth mobile stations.

46. The communications control method of claim 45, wherein the admission of a new mobile station is controlled in accordance with the number of the fifth mobile stations and at least one of the number of the first mobile stations, the number of the second mobile stations, the number of the third mobile stations, the number of the fourth mobile stations, the number of the sixth mobile stations, the number of the seventh mobile stations, and the number of the eighth mobile stations, in the ninth step.

47. A mobile communications system comprising:
 a base station apparatus that carries out communications with plural mobile stations using a shared channel;
 a data server that stores data to be transmitted from the base station apparatus; and
 a monitor terminal device that outputs the data within the data server, wherein the base station apparatus comprises
 a first calculation section that calculates the number of first mobile stations, the number of first mobile stations being at least one of the number of the mobile stations having data to be transmitted through the shared channel in a downlink transmission buffer among the plural mobile stations and the number of logical channels of said mobile stations among the logical channels of the mobile stations;
 a second calculation section that calculates the number of second mobile stations, the number of second mobile stations being at least one of the number of the mobile stations having data to be transmitted through the shared channel in an uplink transmission buffer among the plural mobile stations and the number of the logical channels of said logical channels among the logical channels of the mobile stations;
 a third calculation section that calculates the number of third mobile stations, the number of third mobile stations being the number of mobile stations that highly frequently carry out communications, through the shared channel among the plural mobile stations;
 a fourth calculation section that calculates the number of fourth mobile stations, the number of fourth mobile stations being the number of mobile stations that less frequently carry out communications through the shared channel among the plural mobile stations;

a fifth calculation section that calculates the number of fifth mobile stations, the number of fifth mobile stations being the number of the plural mobile stations among the plural mobile stations;

a sixth calculation section that calculates the number of sixth mobile stations, the number of sixth mobile stations being at least one of the number of the mobile stations having a transmission rate less than a predetermined threshold value among the plural mobile stations and the number of the logical channels of said mobile stations among the logical channels of the mobile stations;

a seventh calculation section that calculates the number of seventh mobile stations, the number of seventh mobile stations being at least one of the number of the mobile stations having a data buffered time longer than a second predetermined threshold value among the plural mobile stations and the number of the logical channels of said mobile stations among the logical channels of the mobile stations;

an eighth calculation section that calculates the number of eighth mobile stations, the number of eighth mobile stations being at least one of the number of the mobile stations having data discarded due to delay among the plural mobile stations and the number of the logical channels of said mobile stations among the logical channels of the mobile stations;

a processing load measurement section that measures processing load;

a calculation section that calculates a transmission rate regarding at least one of the plural mobile stations and the logical channel of the mobile station;

another calculation section that calculations one of a buffered data amount and a data buffered time regarding the plural mobile stations and the logical channel of the mobile stations; and a reporting section that reports to the data server at least one of the number of the first mobile stations, the number of the second mobile stations, the number of the third mobile stations, the number of the fourth mobile stations, the number of the sixth mobile stations, the number of the seventh mobile stations, the number of the eighth mobile stations, the processing load, the transmission rate, the buffer buffered amount, and the buffer buffered time, and wherein the data server comprises a storing section that stores as a statistical value at least one of the number of the first mobile stations, the number of the second mobile stations, the number of the third mobile stations, the number of the fourth mobile stations, the number of the sixth mobile stations, the number of the seventh mobile stations, the number of the eighth mobile stations, the processing load, the transmission rate, the buffered data amount, and the data buffered time; and an output section that outputs to the monitor terminal device at least one of the number of the first mobile stations, the number of the second mobile stations, the number of the third mobile stations, the number of the fourth mobile stations, the number of the sixth mobile stations, the number of the seventh mobile stations, the number of the eighth mobile stations, the processing load, the transmission rate, the buffered data amount, and the data buffered time as a statistical value.

48. The mobile communications system of claim 47, wherein the reporting section reports the number of the fifth mobile stations and at least one of the number of the first mobile stations, the number of the second mobile stations, the number of the third mobile stations, the number of the fourth mobile stations, the number of the sixth mobile stations, the number of the seventh mobile stations, the number of the eighth mobile stations, the processing load, the transmission rate, the buffer buffered amount, and the buffer buffered time, wherein the storing section stores as a statistical value the number of the fifth mobile stations and at least one of the number of the first mobile stations, the number of the second mobile stations, the number of the third mobile stations, the number of the fourth mobile stations, the number of the sixth mobile stations, the number of the seventh mobile stations, the number of the eighth mobile stations, the processing load, the transmission rate, the buffered data amount, and the data buffered time, and wherein the output section outputs to the monitor terminal device the number of the fifth mobile stations and at least one of the number of the first mobile stations, the number of the second mobile stations, the number of the third mobile stations, the number of the fourth mobile stations, the number of the sixth mobile stations, the number of the seventh mobile stations, the number of the eighth mobile stations, the processing load, the transmission rate, the buffered data amount, and the data buffered time as a statistical value.

49. The base station apparatus of claim 1, wherein the calculation section calculates an average value of the number of the mobile stations with respect to each priority class.

50. The mobile communications system of claim 49, wherein the calculation section outputs the calculated value.

51. A base station apparatus that carries out communications with plural mobile stations using a physical uplink shared channel (PUSCH), the base station apparatus comprising:

a calculation section that calculates the number of the mobile stations having data to be transmitted by the PUSCH in an uplink transmission buffer among the plural mobile stations with respect to each priority class, wherein the uplink transmission buffer is a buffer of a Medium Access Control (MAC) layer, a radio link control (RLC) layer, or a packet data convergence protocol (PDCP) layer used in a standard of Evolved-Universal Terrestrial Radio Access (Evolved UTRA) and Universal Terrestrial Radio Access Network (UTRAN) that defines the PUSCH.

52. The base station apparatus claimed in claim 51, wherein the calculation section calculates one of the number of the mobile stations having data to be transmitted through the shared channel and the number of the logical channels of said mobile stations, in accordance with a buffer state reported from the plural mobile stations.

53. The base station apparatus claimed in claim 51, wherein the calculation section calculates an average value of the number of the mobile stations with respect to each priority class.

54. The base station apparatus of claim 51, wherein the calculation section outputs the calculated value.

* * * * *